US008453188B2

(12) United States Patent
Campagna et al.

(10) Patent No.: US 8,453,188 B2
(45) Date of Patent: May 28, 2013

(54) OPEN CABLE APPLICATION PLATFORM SET-TOP BOX (STB) PERSONAL PROFILES AND COMMUNICATIONS APPLICATIONS

(75) Inventors: Theresa Campagna, Philadelphia, PA (US); David L. Chavez, Broomfield, CO (US); Gregory D. Weber, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 380 days.

(21) Appl. No.: 12/050,634

(22) Filed: Mar. 18, 2008

(65) Prior Publication Data

US 2009/0241160 A1 Sep. 24, 2009

Related U.S. Application Data

(60) Provisional application No. 61/022,723, filed on Jan. 22, 2008.

(51) Int. Cl.
*H04N 7/173* (2011.01)
(52) U.S. Cl.
USPC ................ 725/110; 725/46; 725/60; 725/133
(58) Field of Classification Search
USPC .......................... 725/40, 44–47, 60, 110, 133
See application file for complete search history.

(56) References Cited

U.S. PATENT DOCUMENTS

| | | | | |
|---|---|---|---|---|
| 6,236,395 | B1 * | 5/2001 | Sezan et al. ................... | 715/723 |
| 6,397,387 | B1 | 5/2002 | Rosin et al. | |
| 6,564,261 | B1 | 5/2003 | Gudjonsson et al. | |
| 6,637,029 | B1 * | 10/2003 | Maissel et al. .................. | 725/46 |
| 6,898,631 | B1 * | 5/2005 | Kraft et al. .................... | 709/224 |
| 7,075,919 | B1 | 7/2006 | Wendt et al. | |
| 7,181,689 | B2 | 2/2007 | Mock et al. | |
| 7,237,251 | B1 | 6/2007 | Oz et al. | |
| 7,305,697 | B2 | 12/2007 | Alao et al. | |
| 7,522,579 | B1 | 4/2009 | Mangal et al. | |
| 7,610,390 | B2 | 10/2009 | Yared et al. | |

(Continued)

FOREIGN PATENT DOCUMENTS

| | | |
|---|---|---|
| EP | 0982954 | 3/2000 |
| EP | 1162840 | 12/2001 |

(Continued)

OTHER PUBLICATIONS

Search Report issued by the UK Intellectual Property Office for GB Application No. 0823610.1, dated Apr. 7, 2009.

(Continued)

*Primary Examiner* — Kristine Kincaid
*Assistant Examiner* — Sumaiya A Chowdhury
(74) *Attorney, Agent, or Firm* — Sheridan Ross P.C.

(57) ABSTRACT

Utilization of stored of personalized information and communication preferences in a profile in a STB in a structured format or via cookies allows at least a combination of feature rich telephony applications, with the personalized data stored in STBs facilitating feature rich communications sessions. Providing advanced multimedia communications applications using personalized data resident in STBs could allow an entity to provide, for example, many previously unavailable services, and therefore provide considerable new business potential. The personal information stored in the STB can convey many exemplary benefits, such as communication preferences, alternate contact modalities, payment preferences, priority preferences, trusted contacts, personal information, as well as multimedia messaging, etc. The integration of the personal information with the intelligent personal agent also enhances the user experience.

17 Claims, 12 Drawing Sheets

U.S. PATENT DOCUMENTS

| | | | |
|---|---|---|---|
| 2002/0056109 A1 | 5/2002 | Tomsen | |
| 2002/0073421 A1 | 6/2002 | Levitan et al. | |
| 2002/0087968 A1 | 7/2002 | Krishnan et al. | |
| 2002/0144273 A1* | 10/2002 | Reto | 725/86 |
| 2003/0005462 A1 | 1/2003 | Broadus et al. | |
| 2003/0041333 A1 | 2/2003 | Allen et al. | |
| 2003/0048380 A1 | 3/2003 | Tamura | |
| 2003/0086694 A1 | 5/2003 | Davidsson | |
| 2003/0171975 A1* | 9/2003 | Kirshenbaum et al. | 705/10 |
| 2004/0006627 A1 | 1/2004 | Sarfaty et al. | |
| 2004/0029529 A1 | 2/2004 | Kobayakawa et al. | |
| 2004/0048380 A1 | 3/2004 | Saggio et al. | |
| 2004/0073915 A1 | 4/2004 | Dureau | |
| 2004/0111479 A1* | 6/2004 | Borden et al. | 709/206 |
| 2004/0117831 A1 | 6/2004 | Ellis et al. | |
| 2005/0027871 A1 | 2/2005 | Bradley et al. | |
| 2005/0050160 A1 | 3/2005 | Upendran et al. | |
| 2005/0233743 A1 | 10/2005 | Karaoguz et al. | |
| 2005/0235319 A1 | 10/2005 | Carpenter et al. | |
| 2005/0251827 A1 | 11/2005 | Ellis et al. | |
| 2005/0283800 A1* | 12/2005 | Ellis et al. | 725/40 |
| 2006/0020950 A1 | 1/2006 | Ladd et al. | |
| 2006/0034335 A1 | 2/2006 | Karaoguz et al. | |
| 2006/0190358 A1* | 8/2006 | Slik | 705/27 |
| 2006/0218226 A1 | 9/2006 | Johnson et al. | |
| 2007/0101413 A1 | 5/2007 | Vishik et al. | |
| 2007/0107017 A1 | 5/2007 | Angel et al. | |
| 2007/0122108 A1 | 5/2007 | Bontempi | |
| 2007/0156566 A1* | 7/2007 | Nash et al. | 705/37 |
| 2007/0174886 A1* | 7/2007 | Scheuer et al. | 725/110 |
| 2007/0186231 A1 | 8/2007 | Haeuser et al. | |
| 2007/0198738 A1 | 8/2007 | Angiolillo et al. | |
| 2007/0223523 A1 | 9/2007 | Montpetit et al. | |
| 2007/0240230 A1 | 10/2007 | O'Connell et al. | |
| 2007/0250864 A1 | 10/2007 | Diaz Perez | |
| 2008/0005325 A1* | 1/2008 | Wynn et al. | 709/225 |
| 2008/0010584 A1 | 1/2008 | Corsetti et al. | |
| 2008/0046311 A1 | 2/2008 | Shahine et al. | |
| 2008/0288996 A1 | 11/2008 | Walter et al. | |
| 2009/0009586 A1 | 1/2009 | Cassanova | |
| 2009/0133069 A1 | 5/2009 | Conness et al. | |
| 2009/0204993 A1 | 8/2009 | White et al. | |

FOREIGN PATENT DOCUMENTS

| | | |
|---|---|---|
| JP | 2006-229819 | 8/2006 |
| JP | 2006-311582 | 11/2006 |
| WO | WO 00/05889 | 2/2000 |
| WO | WO 00/49801 | 8/2000 |
| WO | WO 01/17250 | 3/2001 |
| WO | WO 01/43424 | 6/2001 |
| WO | WO 2002/044909 | 6/2002 |
| WO | WO 02/069627 | 9/2002 |
| WO | WO 03/088655 | 10/2003 |
| WO | WO 2004/019218 | 3/2004 |
| WO | WO 2005/125203 | 12/2005 |
| WO | WO 2006/061769 | 6/2006 |

OTHER PUBLICATIONS

"Delivering True Triple Play—Composite Applications and the Role of SIP," ALCATEL, retrieved from Internet at http://www.alcatel-lucent.com/tripleplay, retrieved Feb. 6, 2007, 6 pages.
Official Action for Canadian Patent Application No. 2,640,467, dated May 4, 2010.
Extended European Search Report for European Application No. 08017774, dated Apr. 7, 2009.
Communication from European Patent Office for European Patent Application No. 08017774, dated Feb. 16, 2010.
Extended European Search Report for European Patent Application No. 08019405, dated Apr. 9, 2009.
Communication from European Patent Office for European Patent Application No. 08019405, dated Feb. 17, 2010.
Official Communication for European Patent Application No. 08019405.3, dated Aug. 12, 2010.
Official Communication for European Patent Application No. 08019405.3, dated Feb. 18, 2011.
Search Report issued by the UK Intellectual Property Office for UK Application No. 0823608.5, dated Apr. 30, 2009.
Office Action (including translation) for German Patent Application No. D10 2008 061 096.8-53, dated Dec. 14, 2009.
Official Action for U.S. Appl. No. 12/050,575, mailed Sep. 22, 2010.
Official Action for U.S. Appl. No. 12/050,575, mailed Feb. 2, 2011.
Official Action for U.S. Appl. No. 12/050,605, mailed Sep. 13, 2010.
Official Action for U.S. Appl. No. 12/050,605, mailed Jan. 24, 2011.
Official Action for U.S. Appl. No. 12/050,605, mailed Jun. 16, 2011.
Official Action for U.S. Appl. No. 12/050,677, mailed Sep. 17, 2010.
Official Action for U.S. Appl. No. 12/050,677, mailed Jan. 24, 2011.
Official Action for U.S. Appl. No. 12/050,677, mailed May 2, 2011.
Official Action (including translation) for Japanese Patent Application No. 2008-280615, mailed Nov. 21, 2011.
Official Action (including translation) for German Patent Application No. 102008061020.8, dated Sep. 27, 2011.
Examination Report for UK Patent Application No. GB0823610.1, dated Oct. 13, 2011.
Examination Report for UK Patent Application No. GB0823608.5, dated Nov. 10, 2011.
Official Action for U.S. Appl. No. 12/050,677, mailed Oct. 17, 2011.
Official Action for Canadian Patent Application No. 2,640,467, dated Jun. 8, 2011.
Official Communication for European Patent Application No. 08019405.3, dated Jul. 20, 2011.
Official Action for United Kingdom Patent Application No. GB0823610.1, dated Mar. 30, 2012.
Examiner's Answer to Appeal Brief for U.S. Appl. No. 12/050,605, mailed Feb. 16, 2012.
Official Action with English Translation for Japan Patent Application No. 2008-280615, mailed Jul. 23, 2012 4 pages.
Official Action for United Kingdom Patent Application No. GB0823610.1, dated Aug. 2, 2012 6 pages.
Official Action for United Kingdom Patent Application No. GB0823610.1, dated Sep. 19, 2012 5 pages.
Official Action for Canada Patent Application No. 2,640,467, mailed May 31, 2012 4 pages.
Official Action with English translation for China Patent Application No. 200810173936.9, dated Jun. 6, 2012 10 pages.
Official Action for U.S. Appl. No. 12/050,575, mailed Jul. 5, 2012 19 pages.
U.S. Appl. No. 12/050,575, filed Mar. 18, 2008, Campagna, et al.
U.S. Appl. No. 12/050,605, filed Mar. 18, 2008, Campagna, et al.
U.S. Appl. No. 12/050,677, filed Mar. 18, 2008, Campagna, et al.
Background of the Invention for the above-captioned application (previously provided), Sep. 2006.
"Open Cable Application Platform Specifications (OCAP) 1.1.", Cable Television Laboratories, Inc., dated Dec. 29, 2006, pp. 636, available at http://www.opencable.com/ocap.
U.S. Appl. No. 12/130,611, filed May 30, 2008, Campagna, et al.
U.S. Appl. No. 12/130,642, filed May 30, 2008, Campagna, et al.
U.S. Appl. No. 12/134,738, filed Jun. 6, 2008, Chavez, et al.
U.S. Appl. No. 12/210,628, filed Sep. 15, 2008, Campagna, et al.
Miller, et al., "FashionMe: The Future of Fashion Shopping over the Internet", available at http://www.fashionme.iao.fraunhofer.de/Fashionme.pdf, Sep. 2000, pp. 1-6.
Background of the Invention for above-captioned application (previously provided), Sep. 2000.
Official Action for U.S. Appl. No. 12/050,575, mailed Nov. 21, 2012 19 pages.

* cited by examiner

OPEN CABLE APPLICATION PLATFORM SET-TOP BOX (STB) PERSONAL PROFILES AND COMMUNICATIONS APPLICATIONS

CROSS-REFERENCE TO RELATED APPLICATIONS

Cross reference is made to:

U.S. patent application Ser. No. 12/050,575, filed Mar. 18, 2008, entitled "OPEN CABLE APPLICATION PLATFORM SET-TOP BOX (STB) PERSONAL PROFILES AND COMMUNICATIONS APPLICATIONS,";

U.S. patent application Ser. No. 12/050,605, filed Mar. 18, 2008, entitled "OPEN CABLE APPLICATION PLATFORM SET-TOP BOX (STB) PERSONAL PROFILES AND COMMUNICATIONS APPLICATIONS,"; and U.S. patent application Ser. No. 12/050,677, filed Mar. 18, 2008, entitled "OPEN CABLE APPLICATION PLATFORM SET-TOP BOX (STB) PERSONAL PROFILES AND COMMUNICATIONS APPLICATIONS,", all of which are incorporated herein by this reference in their entirety.

FIELD OF THE INVENTION

The invention relates generally to set-top boxes and more particularly to one or more profiles associated with a set-top box. Additional aspects of the invention relate to the interoperability of STB's, one or more profiles and one or more applications associated with the open cable application platform.

BACKGROUND OF THE INVENTION

Multiple Service Operators (MSOs), e.g., cable companies, are working to transform their value proposition from one dominated by basic subscriptions and equipment leases to a customer service driven value model. One of the reasons for this is the recent ruling by the Federal Communications Commission (FCC), which has been upheld in court, that MSOs adopt the Open Cable Application Platform (OCAP) and that Set-Top Boxes (STBs) be open to other uses. With larger pipes, more powerful STBs, and improved customer service applications residing in those STBs, the MSO can begin to dominate the other Local inter-Exchange Carriers (LECs). This enhanced customer service value equation is viewed to be one key to continued MSO growth, increased revenue and increased margins. OCAP is a new paradigm that will allow MSOs to create, or have made, and deploy, a whole suite of new interactive communications services that can drive new revenue streams with higher margins for the MSOs. The OCAP middleware, written in the Java® language, will facilitate "write once, use anywhere" application software to provide new features and services created by third party developers.

The OpenCable™ Platform specification can be found at http://www.opencable.com/ocap/, "OpenCable Application Platform Specification (OCAP) 1.1," which is incorporated herein by reference in its entirety.

OCAP is an operating system layer designed for consumer electronics, such as STBs, that connect to a cable television system. Generally, the cable company controls what OCAP programs can be run on the STB. OCAP programs can be used for interactive services such as eCommerce, online banking, program guides and digital video recording. Cable companies have required OCAP as part of the CableCard 2.0 specification, and they indicate that two way communications by third party devices on their networks will require them to support OCAP.

More specifically, OCAP is a Java® language-based software/middleware portion of the OpenCable initiative. OCAP is based on the Globally Executable MHP (GEM)-standard, as defined by CableLabs. Because OCAP is based on GEM, OCAP shares many similarities with the Multimedia Home Platform (MHP) standard defined by the Digital Video Broadcasting (DVB)-project. The MHP was developed by the DVB Project as the world's first open standard for interactive television. It is a Java® language-based environment which defines a generic interface between interactive digital applications and the terminals on which those applications execute. MHP was designed to run on DVB platforms but there was a demand to extend the interoperability it offers to other digital television platforms. This demand gave rise to GEM, or Globally Executable MHP, a framework which allows other organizations to define specifications based on MHP.

One such specification is OCAP which has been adopted by the US cable industry. In OCAP the various DVB technologies and specifications that are not used in the US cable environment are removed and replaced by their functional equivalents, as specified in GEM. On the terrestrial broadcast side, CableLabs and the Advanced Television Systems Committee (ATSC) have worked together to define a common GEM-based specification, Advanced Communications Application Platform (ACAP), which will ensure maximum compatibility between cable and over-the-air broadcast receivers.

Packet Cable 2.0 is a specification based on the wireless Third Generation Partnership Program (3GPP) Internet protocol Multimedia Subsystem (IMS), which uses Session Initiated Protocol (SIP) for session control. By using SIP, MSOs can create the foundation of a service delivery platform on top of their existing DOCSIS (Data Over Cable Service Interface Specification) or cable modem service. Two of the SIP features that are particularly important to this invention are extensibility and interoperability. These SIP features are important because new messages and attributes can be easily defined and communications between previously incompatible endpoints are facilitated.

Another development that sets the stage for the disclosed inventions is the processing power, multimedia codecs and storage capabilities of the STBs. Many of the more advanced STBs have Digital Video Recorders (DVRs) based on hard disk drives or flash memory that provide many gigabytes of available storage. They also have advanced audio/video codecs designed to handle the requirements of High Definition Television (HDTV). Processors such as the Broadcom BCM7118 announced in January 2007, provide over 1000 Dhrystone mega-instructions per second (DMIPS) worth of processing power to support OCAP, new customer applications, and DOCSIS 2.0 and DSG advanced mode. The Broadcom chip, and other general purpose and application-specific integrated circuit (ASIC) processors used for STBs, provide powerful security capabilities such as the emerging Polycipher Downloadable Conditional Access Security (DCAS) system. DCAS eliminates the need for a CableCard and supports multiple conditional access systems and retail products.

SUMMARY OF THE INVENTION

These technologies provide the platform for a greatly enhanced, multimedia, customer communication experience. Specifically, one exemplary aspect of this invention is advanced multimedia communications via OCAP using customer specific profiles resident in the STB. Telephony application servers have already been proposed by CableLabs and others. Phone and STB association can be done in the MSO network. Similarly, personalized information for the display of financial data, home security information and the like, is also known.

However, an exemplary aspect of this invention utilizes storage of personalized information and communication preferences in the STB in a structured format or via cookies. The combination of feature rich telephony applications with the personalized data stored in STBs facilitates feature rich communications sessions. Providing advanced multimedia communications applications using personalized data resident in STBs could allow the MSOs to provide, for example, many previously unavailable services, and therefore provide considerable new business potential.

The types of personal information that can be stored in STBs may include, but are not limited to, communication preferences, payment preferences, vendor preferences, priority preferences, personal information, etc. Examples of communications preferences could include when to be reached or not reached, numbers to reach, calendar synchronization, etc., and in general any information related to communications. Examples of payment preferences could include credit card information, direct deposit/debit information, what financial instrument was used for the most recent transaction with a specific company, and in general any information related to transactions. Examples of vendor preferences could include favorite delivery pizza, most commonly ordered items, etc. Examples of priority preferences could include conditions like don't interrupt me watching the Chicago Bears beat the Green Bay Packers unless it is my boss calling, and in general any preference that can be used to assist with priority determinations. Examples of personal information could include clothing or shoe size, favorite colors, name, address, etc., and in general any information about an individual(s). Other such personal information categories and variations stored in STBs as can be imagined by one schooled in this art are also within the scope of this invention disclosure.

Screen menus, pushed URLs, and adaptations specific to various devices connected to STBs (such as different size screens, different capability devices, etc.) can be rendered as part of this process of enhanced communications. Similarly contextual favorites or preferences can be provided depending on what content is being displayed or interacted with.

When one combines the integration of a profile, such as, for example, personal information in STBs, with applications resident in a variety of places on the MSO's network, these new value added services are enabled.

A few simple examples of what is possible could include, but are not limited to, enhanced web enabled service transactions, mobile requests for goods or services using the profiles and communication capabilities of the STB/MSO network, display of or sharing of information among two or more individuals, etc.

For example, the user can initiate a service transaction on the STB itself. The exemplary menu based request will use the stored service information entry to key a web service request. If the request should trigger a human response (like communication with a retention agent when service cancellation is requested), then the STB information can key to the customer phone for an outbound call to confirm the cancellation request and allow the agent to describe a retention offer.

Another example could be a user delayed at work wanting to order a pizza to be ready shortly after their arrival at their home. The user can access personal information in their remote STB about their preferred vendor, most recent order and previous method of payment. They can place a new pizza order based on this stored information rather than having to key or speak all this information while driving. The user benefits from an enhanced user experience, the accuracy of the order is improved, and they can have the food arrive closely timed with their own arrival at home.

Another example is when a user has relocated to a new city or state; they may not have had the time to develop favorite vendors for pizza or other goods and services. In such a case, the MSO can push a list of preferred partners to the new user that the new user can edit or modify based on their own personal experiences and preferences.

The exemplary embodiments discussed herein just hint at the power of the proposed enhancement to this new communications paradigm. There are many other potential examples and applications to serve them that are possible.

For example, it is generally recognized that an intelligent agent is a software agent that assists users and will act on their behalf, in performing non-repetitive computer-related tasks. An agent in this sense of the word is like an insurance agent or a travel agent. While the working of software agents used for operator assistance or data mining (sometimes referred to as bots) is often based on fixed pre-programmed rules, "intelligent" in this context is often taken to imply the ability to adapt and learn. The term "personal" indicates that a particular intelligent agent is acting on behalf of an individual or a small collective group of users such as a household, business entity, etc.

OCAP provides another venue for an intelligent personal agent but offers several advantages compared with previous attempts at this type of application. One is the fact that STBs are already equipped to handle two-way, full-motion, High Definition (HD) video, as well as any other communication media. Another advantage is the integration of the personal profile information with the Intelligent Personal Agent application. Another is the improved security discussed herein. The extensibility and the interoperability that the Session Initiation Protocol (SIP) adds to Packet Cable 2.0 allows the full gamut of communications modalities and devices to be leveraged.

Another exemplary aspect of the invention is the use of personalized information and personal preferences contained in a STB in combination with an intelligent personal agent application and improved security to provide, for example, a greatly enhanced user agent experience.

The fact that sensitive information about the user can be stored within their own STB reduces security concerns associated with having too much web presence. The disclosure or query of the personal information can be established on a trust basis which also helps with security and privacy. The push of security information such as DCAS makes the environment significantly safer. One could also envision if there are multiple users within one household, that they can each have a profile that is login protected for personal privacy. Parents would be able to set certain conditions/limits for children using the intelligent personal agent application that would also add to the safety and age appropriate use of the application.

The two-way, full-motion, HD video without many of the quality issues associated with the Internet is a significant enhancement to current intelligent personal agents. It could provide an opportunity for video messages to be personalized for the party which is initiating the contact.

The personal information stored in the STB can convey many exemplary benefits such as communication preferences, alternate contact modalities, payment preferences, priority preferences, trusted contacts, personal information, as well as multimedia messaging, etc. The integration of the personal information with the intelligent personal agent also enhances the user experience.

There are several examples of what this idea can provide the user that current intelligent agents are not able to do. One is the ability to greet calling parties with a fall motion video greeting unique to that calling party. Another is the ability to handle more complicated transactions. For example, the user wants to buy a particular item at a particular price from one of several preferred vendors. Offers from preferred business partners can be pushed to the MSO's users and the content can be filtered, compared with conditions set by the user for a purchase, and the intelligent personal agent can either complete the transaction or call the user on a mobile device to seek approval and then transact business. While there are shopping agents, mobility applications and contactless payment devices, this intelligent agent can provide a user experience unequaled in the current art. Another possible variation is for the intelligent personal agent to coordinate multiple parties within a household. Let's say an invitation arrives inviting a family over to dinner at the calling party's house. The intelligent agents can interact with personal information and scheduler software for all of the members of the family to make certain that the invite has considered each members previous commitments prior to replying and either accepting or modifying the proposed dinner invitation. There are numerous other variations that are possible with this intelligent personal agent not possible within the existing art.

Social network services focus on the building and verifying of online social networks for communities of people who share interests and activities, or who are interested in exploring the interests and activities of others, and that necessitates the use of software.

Most social network services are primarily web based and provide a collection of various ways for users to interact, such as chat, messaging, email, video, voice chat, file sharing, blogging, discussion groups, and so on.

The main types of social networking services are those that contain directories of some categories (such as former classmates), means to connect with friends (usually with self-description pages), and recommender systems linked to trust. Popular methods now combine many of these, with MySpace™, Bebo™ and Facebook™ services being the most widely used.

OCAP combined with personal profile information provides another venue for a social network, but offers several advantages compared with previous attempts at this type of application. One is the fact that, as discussed, STBs are equipped to handle two-way, full-motion, High Definition (HD) video. Another is the improved security discussed above. The extensibility and the interoperability that SIP adds to Packet Cable 2.0 allows the full gamut of communications modalities and devices to be leveraged. One exemplary embodiment of the social network proposed here can be one-to-one, one-to-many and many-to-one, and can cover both personal and professional interest areas.

Another exemplary aspect of this invention is the use of personalized information and personal preferences contained in a STB combined with two-way, full-motion, HD video and improved security to provide a greatly enhanced social networking experience.

The two-way, full-motion, HD video without many of the quality issues associated with the Internet is a significant enhancement to the current social networking offerings. It would provide an experience that is much more like a face-to-face interaction.

The personal information stored in the STB can convey all of the benefits listed above such as communication preferences, alternate contact modalities, payment preferences, priority preferences, trusted contacts, personal information, etc. The integration of the personal information combined with the social networking application(s) also enhances the user experience. In addition to the normal uses of a social networking application such as on-line dating, discussion groups, virtual communities, and the like, one can imagine extensions to the use of this application. One such extension would be the addition of personal reviews of restaurants, movies, books, music, and the like. Other users of the social network could determine over time which reviewers tend to rate goods and services consistently with their interests and/or from a perspective that they enjoy their reviews, and could preview the ratings provided about items of interest by those reviewers. One could also see reviews when previewing related media. The reviewers and the users that tend to agree or become popular could go on to form their own social network based on their experience with each other's recommendations or interactions. With the extensibility of Packet Cable 2.0, a user could also provide a review of a movie that they had just viewed in a theater via their cell phone while their thoughts are fresh.

Many small businesses start out as part-time home businesses. In addition, some people run a small business focusing on rental properties, or the like, in parallel with their normal employment. Some fairly sizable businesses are run at locations served by MSO DOCSIS services. OCAP provides an opportunity to integrate business profile information into STBs similar to how personal information is integrated in a STB, as discussed in above. Further, business application software, such as the Quicken® Home and Business program or the Quicken® Rental Property Manager program can be advantageously integrated together with business information profiles in the STB.

There are many other instances where OCAP can provide an enhanced user experience to business users. Via OCAP, and with a business profile, actual inventory levels can be compared with desired levels stored as business information in the STB. Since preferred vendor and preferred payment information can also be stored, when inventory runs below a certain level, it can be automatically ordered, or alternatively, OCAP can provide a pop-up or call a specified phone number such as a mobile phone to confirm that the inventory reorder should be processed.

Another example would be management of a rental vacation property. Not only could the landlord view bookings and the like, but the ability to extend a rental stay could be offered to the guest via the TV/STB when such an opening is available. Further, an offer to return at a future date could also be made via OCAP. In this way, the renter feels that they are getting increased attention without significant intrusion, and the landlord is more likely to be able to keep the rental property at maximum capacity.

While the internet provides some of these types of features, OCAP allows for, as an example, a richer feature set, improved convenience and the ability to leverage previously incompatible devices in a seamless way. Specifically, the ability to reorder inventory when the small business owner is mobile, and the ability to provide all of the information regarding the transaction such as vendor, inventory type and quantity, preferred payment options, and the like, without the small business owner having to key in such information, is useful. Similarly, renting vacation properties is typically done via the internet. However, not everyone takes a PC or web-enabled device everywhere with them. Offering the ability to extend a stay, rebook a future vacation, or offer incentives to good repeat guests can all be done via OCAP and displayed on a TV or forwarded as an audio message to the rental property phone.

The use of business information and business preferences contained in a STB integrated with other PC or STB-based business software can provide full compatibility with previously incompatible endpoints and improved security to provide a greatly enhanced business experience.

The fact that sensitive information about business(es) can be stored within their own STBs improves security concerns associated with web-based attacks. The disclosure or query of the business information can be established on a trust basis, which also helps with security and privacy. The push of security information, such as DCAS, also makes the environment significantly safer. One could also envision, if there are multiple users within one entity, that they can each have a profile that is login protected for privacy. In addition, one or more members of the entity can also have a business profile in the STB.

The two-way, full-motion, HD video, without many of the quality issues associated with the Internet, is also a significant enhancement to businesses. It provides, for example, an opportunity for video messages to be personalized to the guest or customer when the business owner is unavailable.

The business information stored in the STB can also convey the benefits of personal information listed above, such as communication preferences, alternate contact modalities, payment preferences, priority preferences, trusted contacts, inventory levels, business events/calendar, as well as multimedia messaging, etc. The integration of the business information combined with existing business software enhances the business owners' ability to conduct their businesses.

There are several examples of what this idea can provide to the business user that current PC based software does not allow. One is the ability to greet guests and customers with a full motion video greeting unique to each party. Another is the ability to handle more complicated transactions. For example, a vacation rental guest decides that they really like the property that they rented, but would like to consider other such properties for a future vacation prior to the end of their current vacation. Offers from the landlord can be extended to preferred guests while on their current vacation for reduced rate stays at this or other properties, to retain the guest's business. All of this can be displayed to the TV at the property, or if the TV is not used, sent via an audio message to the phone in the rental. There are numerous other variations that are possible with this business application and profile that are not possible within the existing art.

Aspects of the invention thus relate to one or more profiles on a STB.

Aspects of the invention further relate to the use of personalized information and personal preferences associated with a STB combined with an intelligent personal agent application and improved security to provide an enhanced user experience.

Aspects of the invention also relate to use of a personalized profile of communications preferences and personal information resident in STBs combined with communications applications also resident in STB's to enable enhanced communications and customer service in an OCAP/IMS network(s).

Aspects further relate to having business information and preferences stored in STBs, an OCAP business application combined with existing business software and enhanced security within an OCAP/IMS network(s).

Aspects also relate to use of a personalized profile of communications preferences and personal information resident in a STB combined with two-way, full-motion, high definition video and enhanced security to implement a social networking application within an OCAP/IMS network(s).

Aspects also relate to utilizing a master profile to regulate creation and use of subordinate profile(s).

Aspects also relate to integration and cooperation between a profile associated with a STB and one or more applications associated with other electronic devices.

Aspects of the invention can also be used to support enhanced e-commerce in association with a STB.

Aspects still further relate to business management in conjunction with one or more business profiles on a STB.

Aspects also relate to setup and use of an automated agent performing certain tasks in association with a profile associated with a STB.

Additional aspects relate to a set-top box with an operating system layer supporting cable network interconnectability and providing an application platform on which one or more customer service applications can be run.

Aspects still further relate to use of social networking applications and integration with a profile associated with a STB.

These and other needs are addressed by the various embodiments and configurations of the present invention.

The present invention can provide a number of advantages depending on the particular configuration.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

Figure 1:
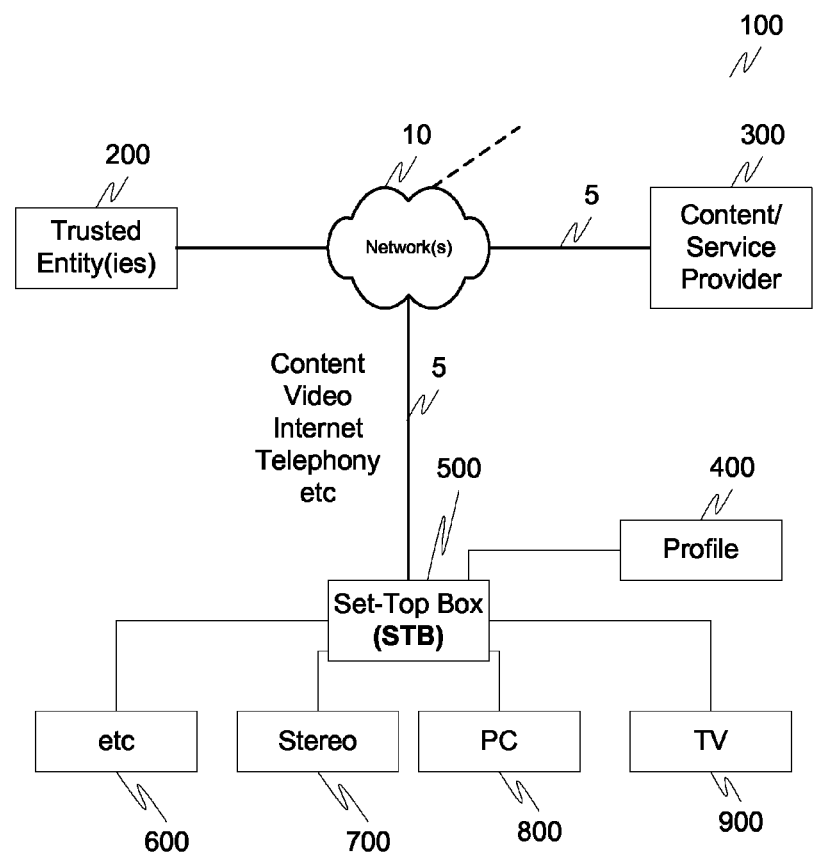
FIG. 1 illustrates an exemplary content system according to this invention.

FIG. 1 illustrates an exemplary content system 100. The system 100 comprises one or more trusted entities 200, one or more content/service providers 300, such as a cable company, and a set-top box 500, all interconnected by one or more links 5 and networks 10. The set-top box 500 is connected to one or more of a stereo 700, PC 800, TV 900, or in general any electronic device as represented by box 600. Associated with the set-top box 500 are one or more profiles 400, as will be discussed in detail hereinafter.

In general, the set-top box 500 is capable of receiving content, such as video content, as well as providing services such as access to the internet, telephony service, and the like. As will be discussed hereinafter, the set-top box is also capable of providing services such that, for example, the user located at one of the attached devices utilizes the set-top box 500 to assist with the ordering, consumption and/or management of the service.

Typically, the content/service provider 300 provides content, such a video content, to a user via the set-top box 500. An exemplary embodiment of the present invention expands on this concept and in conjunction with profile 400 provides enhanced content capabilities through the set-top box 500.

Furthermore, and in accordance with an optional exemplary embodiment, trusted relationships can be established between the content/service provider 300 and one or more trusted entities 200. For example, the content/service provider 300, such as a cable company, can negotiate trusted relationships with various service providing entities. Upon the completion of various checks and assurances from the service providing entities, the various entities could be listed as a trusted entity 200, at which point service requests made via set-top box 500, in conjunction with profile 400, would be handled in a different manner.

The association of the profile 400 with the set-top box 500 allows, for example, a richer communications environment to be provided to a user. For example, a customer at their home calls into a customer service number. Instead of the call being rerouted from center to center based on information the customer inputs via the phone, the call can use a common customer routing center. The routing center, which could be one of the trusted entities 200, can use the phone number to look-up a key set-top box entry for the customer, and the center can then electronically retrieving the stored service information entry via the set-top box 500, from the profile 400. The information retrieved from the profile 400 can be combined with the caller's requested service, routed to the appropriate agent with the information retrieved from the customer STB (relieving the need to interrogate other databases or the user and making for more efficient contact centers), and additional information for the customer can be displayed on, for example, the TV 900 or PC 800 associated with the set-top box 500.

In another example, the customer can initiate a service transaction on the set-top box itself. For example, a menu based request can use stored service information in the profile 400 to key a web service request. If the question triggers a human response, like that from a retention agent when service cancellation is requested, the set-top box information can key to the customer phone for an outbound call to confirm the cancellation request and allow for a retention offer to be made.

Therefore, in accordance with one exemplary embodiment, the profile 400 can be used, for example, to assist with contacts to a contact center and can be utilized in conjunction with the set-top box to provide a service to, for example, other retailers, service outfits, and trusted or other entities. The set-top box can also store customer service records specific to, for example, an individual or a business. The same method used to assist with a customer service contact as discussed above could similarly be used to access records or other information stored in the profile 400 to assist with business services, business management, online banking, or the like.

For example, the same mechanisms can be used to push structured information and menu information for the requested transaction, inquiry, or service request, thereby providing a richer customer service experience. This richer experience combined with the ease of retrieval of customer service information, personal information and/or business information from the profile 400 provides, for example, a significantly richer customer contact capability than that which can be offered by traditional centers. This in turn gives an opportunity for new large business service opportunities for the contact/service provider 300.

In accordance with an exemplary embodiment, the profile 400 used in conjunction with one or more applications on the set-top box 500 provides a richer experience for a user of the set-top box for interacting with one or more content/service providers, trusted entities, other entities, or in general any entity that may be able to provide a richer customer experience based on the information available to them via the profile 400.

Figure 2:
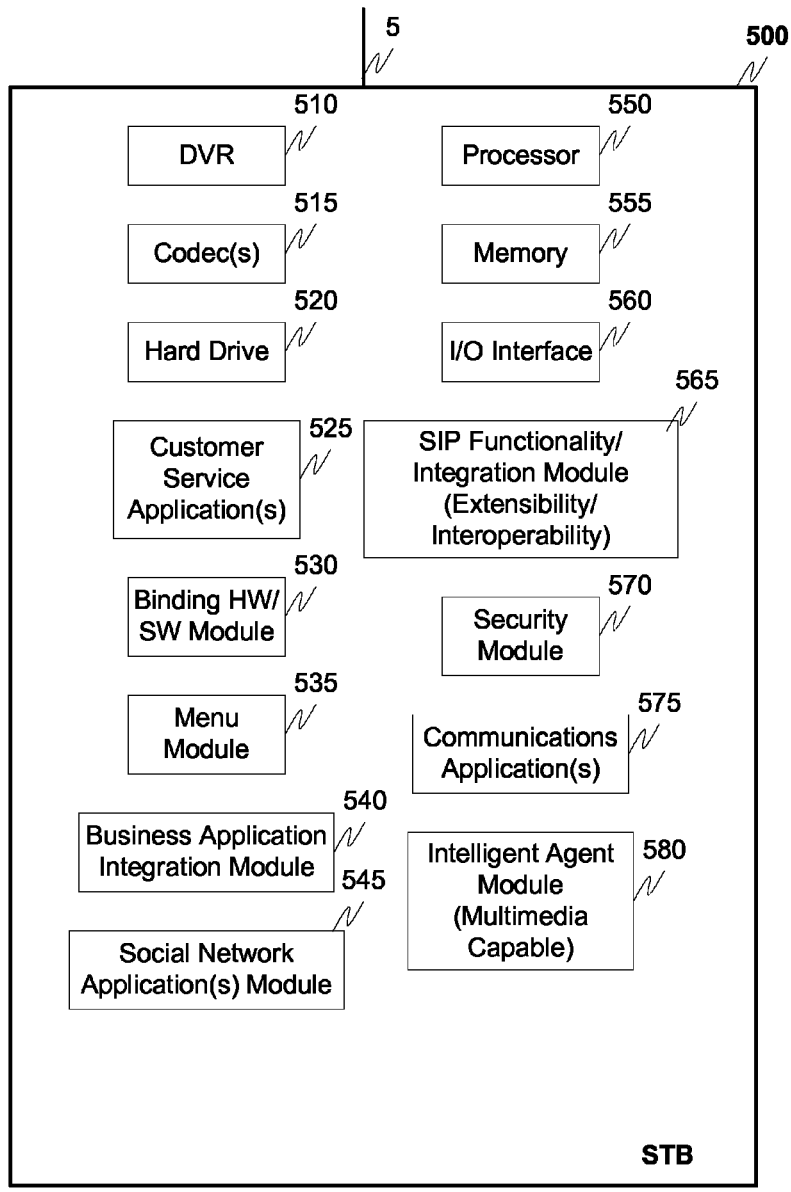
FIG. 2 illustrates an exemplary set-top box according to this invention.

FIG. 2 illustrates in greater detail an exemplary set-top box 500. The exemplary set top box includes one or more of a DVR 510, codec 515, hard drive 520, one or more customer service applications 525, a binding hardware/software module 530, a menu module 535, a business application integration module 540, a social network applications module 545, a processor 550, a memory 555, an I/O interface 560, a SIP functionality/integration module 565, a security module 570, one or more communications applications 575 and an intelligent agent module 580.

The DVR 510 can be used to store video information, as is conventionally known, and can also be used as a storage device for one or more applications on the set-top box. For example, the DVR 510 can used as back up for non-active applications, while active applications can be run on, for example, the hard drive 520 in conjunction with one or more of the processor 550, memory 555 and I/O interface 560.

The set-top box can also include one or more codecs 515 that provide, for example, one or more of coding and decoding of video information, audio information, high-definition video information, multimedia information, or in general any audio or video format received by or sent from the set-top box 500.

The set-top box 500 also includes one or more customer service applications 525. These customer service applications can cooperate with the profile 400 to provide various functionalities to a user at one or more of a TV 900, PC 800, stereo 700, or in general any electric device 600 connected to the set-top box 500. As discussed above, these customer service applications can include, but are not limited to, ordering, online banking, call center assistance applications, profile management applications, or in general any application that is capable of operating on or in conjunction with the set-top box 500. As will be appreciated, the application need not run exclusively on the set-top box 500, but could operate in conjunction with one or more applications, on, for example, a connected electronic device such as PC 800.

The hardware/software binding module 530 allows the set-top box 500 to be associated with one or more other electronic devices, such as a telephone, soft phone, or in general any device that is capable of being bound to the set-top box 500. For example, if a user activates a customer service application on the set-top box 500 to cancel the particular service with a trusted entity 200, upon the intelligent agent module (discussed hereinafter) determining that a cancellation service request has been initiated, the intelligent agent module can request the hardware/software binding module to initiate a call so that the user can communicate directly with the trusted entity customer service agent regarding the cancellation request. This binding can be done, for example, with the cooperation of the SIP functionality/integration module 565, in that SIP provides a convenient mechanism to established, tear down, or redirect communications. More specifically, stored within the profile can be information specifying phone information associated with the user of the set-top box. SIP protocols can be initiated from the STB to specify that the phone associated with the user is to place a call to a specific customer service agent. A message indicating that a phone call has been initiated can then be displayed on one or more of the phone and a device associated with the STB 500.

The menu module 535 provides an interface, such as a graphical user interface, which can be displayed on one or more of the TV 900, PC 800, or in general any display device that allows manipulation of, for example, one or more of the features of the set-top box 500 and one or more profiles. For example, a user can utilize the menu module 535 to edit one or more profiles 400 stored on the set top box. Additionally the menu module 535 can used in conjunction with various customer service applications 525 residing on the set top box to provide necessary menus to the user associated with the particular customer service application that was requested. For example, in an on-line banking environment, where their customer service application provides to the user the ability to manage their bank accounts, the customer service application can serve various menus in conjunction with the menu module 535 that allow the various actions associated with the customer service application to be performed. Menu module 535 can also cooperate with one or more of the content/service provider 300, trusted entities 200, or other entities on the network 10, to provide menus to a user of the set-top box 500 in conjunction with one or more of the services, products, or features provided by that particular entity.

For example, if the set-top box 500 is in communication with a real estate agent connected to network 10, the real estate agent could push a series of menus to the menu module 535 that allow the user of the set-top box 500 to access various listings of that agent. With these menus, the user could set up, for example, virtual viewings of the listing in high-definition video formation. The SIP functionality 565 could also be used to spawn a call that is bound to the real estate viewing application in conjunction with the hardware/software binding module 530. Personal preferences of the user could also be layered on top of the menus pushed to the STB to account for their own personal preferences, such as skin-type display characteristics.

The business application integration module 540 allows one or more business applications stored on, for example, PC 800, to be utilized in conjunction with the set-top box 500 and profile 400. In addition to the stand-alone business application(s) stored on the set-top box, the business application integration module 540 allows for integration and sharing of information stored in, for example, the profile 400 with one or more business applications, such as financial management applications, run on the PC 800. To provide a layer of security for these communications, the business application integration module 540 can cooperate with the security module 570 to regulate the type of information that can be shared by the set-top box 500, the profile 400 and the other financial management applications. For example, the profile 400 can be associated with a number of rules governing who has access to one or more portions of information, who can spawn customer service applications, who can authorize use of funds, or in general any rule that governs, regulates, restricts or allows access to one or more of information within the profile, applications on the set top box, or communications for the set-top box 500 to an entity connected to network 10.

The social network application module 545 in a similar manner cooperates with the profile 400 and set-top box 500 to allow the use of personalized information and personal preferences as contained in the profile 400 to provide a richer social networking environment. For example, social networking applications used in conjunction with the set-top box 500 allow the user to experience two-way, full-motion high-definition video content as well as enhanced security. For example, storing personalized information and personal preferences in the profile 400 can provide a layer of security above that which is typically associated with a web presence. The disclosure, query or access to information in the profile 400 can be based on one or more of a trust relationship with one or more trusted entities, analysis by the intelligent agent, or rules associated with a profile, or a master profile. The push of security information such as DCAS makes the environment associated with the use of the profile 400 significantly safer. As discussed above, social networking applications can be established on a hierarchical basis where, for example, parents would be able to set certain conditions, limits or thresholds for children using a social networking applications to add safety and age appropriate rules governing use of the applications, as well as access to information within the profile and restrictions on access to the various types of service applications available to that particular user.

The set-top box environment also provides the ability to utilize two-way, full-motion video, in addition to high-definition video, and does not suffer from the drawbacks associated with typical internet-based applications, such as latency, dropped frames, and the like. The social network application module 545 is thus capable of providing interaction with one or more other participants that is more like a face-to-face interaction.

As with the other modules, the social network application module can benefit from the various information stored on the profile 400 and features of the set-top box 500 such as communications, preferences, alternate contact modalities, payment preferences, priority preferences, trusted contact information, personal information, business information, or the like. The ability to integrate the personal information stored in the profile 400 with one or more social networking applications associated with the social network application module 545 provides the ability to enhance a user's experience.

In general, any application stored in a social network applications module 545 can be used for social networking. These applications can include any type of communications modality such as video, text, image sharing, or the like, in either a one-directional, two-way or multiparty format. For example, multimedia versions of social networking applications can also be used that combine one or more of the above with such functionality, as, for example, blogging, real-time whiteboarding, chatting, video conferencing, or in general, any multimedia application between one or more parties.

The SIP functionality/integration module 565 allows one or more SIP-based communications to be used in conjunction with the set-top box 500 and profile 400. These SIP-based communications could be run in parallel with various applications run on the set-top box 500 and, as discussed above, can be bound to one or more other devices such a telephone, PDA, home phone, business phone, or in general any SIP-enabled device. In addition to being able to run in parallel with one or more applications on the set-top box 500, upon execution of a specific customer service application initiated in the set-top box, a SIP communication could be established and, once active, the corresponding communication on the set-top box could optionally be terminated.

Security module 570 can provide varying levels of security for the information within the profile 400. Furthermore, as previously discussed, a hierarchical security platform can be established with, for example, a master profile that regulates dependent profiles, such as those that would be established by parents for their children. Extending this basic concept to a business environment, business managers could also set up various rules in conjunction with the security module 570 regulating the control, access to, and usability by employees of information stored in the profile 400.

In general, since any information can be stored in the profile 400, various rules, policies, profiles, and the like, can be established that govern not only access to, but dissemination of the information within the profile. For example, access to the various types of information in the profile can be regulated based on who is trying to access the information, what type of information is being accessed, what the accessed information is going to be used for, and the like and can be analyzed by the security module 570 to determine whether that access or dissemination should be allowed. For example, the security module 570 can cooperate with the intelligent agent module 580 to assist with analysis of any security risks that may be associated with providing access to the information within the profile 400.

Communications applications module 575 enables various types of communications application to be used with the set-top box 500. These communications include, for example, audio communications, video communications, chat communications, telephony-type communications, or in general any communication between the set-top box and, another entity on the network, with one or more of the devices associated with and connected to the set-top box, to another entity on the network, or communications associated with a bound device, such a bound IP soft phone.

Intelligent agent module 580 is a software agent that assists users with various functions and is capable of acting on their behalf in an automated or semi-automated manner. Intelligent agent module 580 is thus capable of cooperating with one or more of the other modules in the set-top box, or devices connected to the set top box, and based on information and/or rules within the profile 400, to perform various actions. The actions can be triggered by one or more triggering events that may be based on information received by the set-top box, or information sent to an entity on the network 10. For example, upon receiving a new program schedule, the intelligent agent could parse the various shows that are scheduled to be shown within the next week, and knowing, based on information within the profile 400, if their user is a fan of a particular actor, automatically docket the recording of the movie featuring the actor.

As another example, the intelligent agent module 580 can monitor the various interactions between the set-top box and entities on the network 10. If, for example, a parent has established restrictions on social networking applications associated with a child, and the intelligent agent module 580 detects that the child is attempting to access one of these social networking applications on the prohibited list, the intelligent agent module can spawn a communication to the parent indicating such an attempt. For example, the intelligent agent module can cooperate with an email or call spawning module and, for example, send a text message to the parent indicating that the child was trying to access a prohibited social networking application at a given date and time. This can be enabled with cooperation of the SIP functionality module 565 and the text message sent to a SIP enabled endpoint. At the same time, a communication could be established between the SIP endpoint and the set-top box, and if the SIP endpoint is video enabled, real-time communications could be established between the parent and child to discuss their activities.

Figure 3:
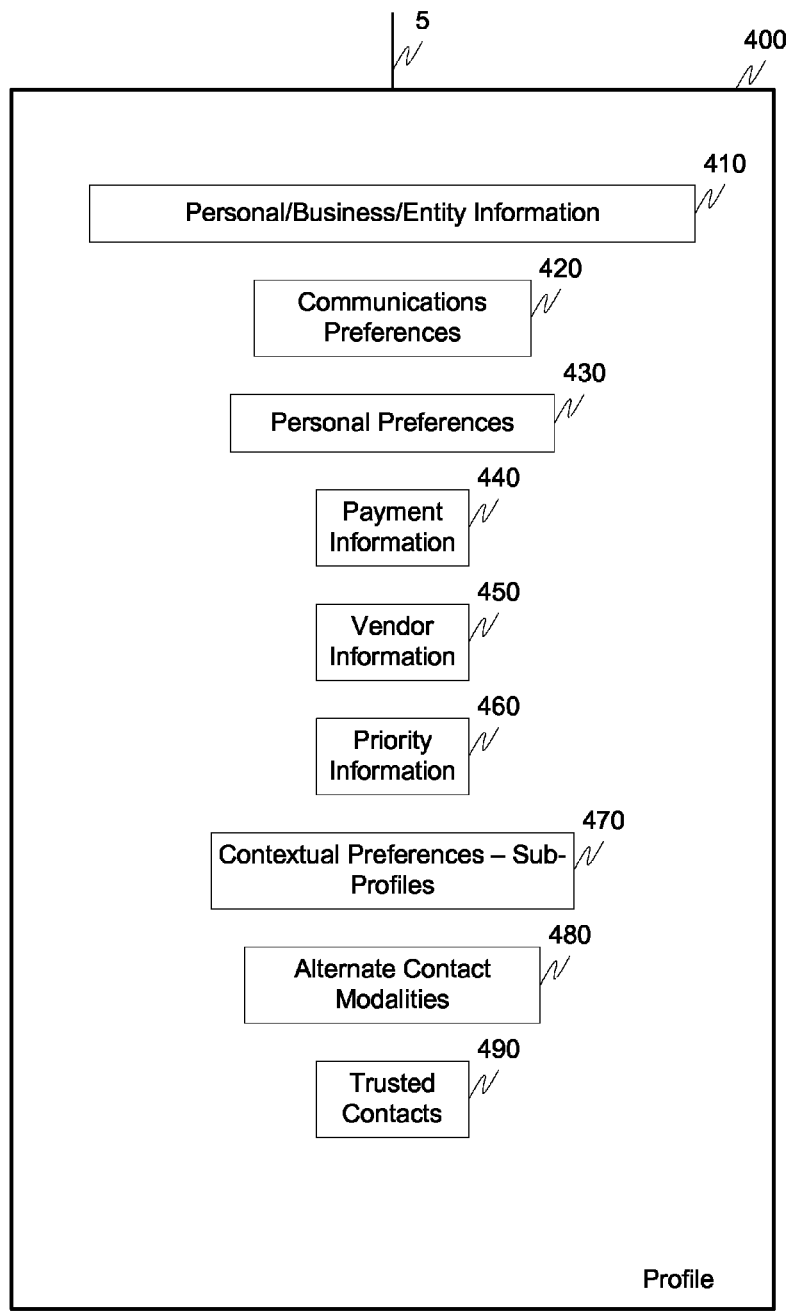
FIG. 3 illustrates an exemplary profile according to this invention.

FIG. 3 outlines an exemplary profile 400. The exemplary profile 400 comprises one or more of business, personal, and entity information 410, communications preferences 420, personal preferences 430, payment information 440, vendor information 450, priority information 460, contextual preferences and sub-profiles 470, alternate contact modalities 480 and one or more trusted contacts 490.

As discussed, one ore more of the personal, business and entity information can include any information that a user would like to store. For example, examples of personal information include name, address, credit card information, banking information, movie preferences, communications preferences, restaurant preferences, vendor preferences, billing preferences, and the like. Examples of business information includes, for example, preferred vendors, banking information, communications preferences, ordering or inventory information, employee information, payment information, accounting information, business management information, or in general any information related to a business. Entities can also include information about items such as groups of individuals, groups of businesses, or in general any entity that may not be personal or business in nature. Interfaces that can be provided that provide access to the information stored within the profile, and this information can be edited, updated or deleted as appropriate. The editing, updating or deleting of this information can be performed via an interface on the set-top box, or via any interface connected to the set-top box. This access to the information within the profile can be password protected, and the information can be transferred via or in accordance with well known encryption techniques and standards.

The communications preferences 420 provide to the user the ability to store various types of communications preferences or modalities that can effect not only the type of communication to use to access the user, e.g., video, chat, IM, telephone, or the like, but that can also be used in conjunction with presence information and/or communication routing.

The personal preferences 430 are a set of rules related to a particular user's personal preferences. These personal preferences can relate to any functionality of the set-top box, display characteristics of the STB, operation of the STB, or the like, and can be related to any one or more of menu options, communications preferences, contact preferences, set-top box management, or the like.

Vendor information 450 stores various information that can be used for payment of goods and/or services ordered through or in conjunction with the set-top box. This payment information can have a higher security level than other types of information within the profile 400, such that, for example, a password is required before the purchase for goods and services can be made. Additionally, the payment information could be limited to use by the contact/service provider 300.

Vendor information 450 can include such information as preferred vendors, vendors who should not be used, historical purchase information, account information, reference information associated with a particular vendor, or in general any information associated with a vendor. When new vendors are utilized, and in conjunction with the intelligent agent module 580, new information can be added to the vendor information 450 and stored in the profile 400.

In addition, also in conjunction with the intelligent agent module 580, the vendor information 450 can be dynamic such that as, for example, a user accesses a particular vendors website, account information can be populated into the vendor information 450 such as order placed, remaining balance, special offerings, or in general any information associated with that particular vendor.

Priority information 460 includes any information, such as rules, that can be used to assist with prioritizing certain activities, applications, or in general, any functionality associated with the set-top box 500. This priority information 460 could also be used in conjunction with the intelligent agent module 580 to assist with determining prioritization of certain activities.

The contextual preferences and sub-profiles 470 establishes preferences based on context that could also be categorized as sub-profiles depended upon, for example, a particular application being run on the set-top box 500. As with the other types of information, the contextual preferences 470 can be used in conjunction with the intelligent agent module 580 to provide dynamic application behavior.

The alternate contact modalities 480 outline various contact modalities for a particular user. These alternate contact modalities 480 can be used with the communication preference information, personal preference information and/or priority information to assist with completion of an incoming communication to an endpoint. For example, based on information in the alternate contact modalities profile, one or more of the binding module and SIP functionality module can be utilized to complete an incoming communication to an endpoint where the user is located.

Trusted contacts 490 include information regarding one or more entities that are trusted. For example, an entity can be trusted if it is approved by the content/service provider 300. Additionally, an entity can be trusted if, for example, the user has had previous interactions with the entity and has identified them it as being trusted.

Optionally, the intelligent module 580 can also be used to analyze transactions with a particular entity, and upon, for example, a threshold number of transactions being completed in a satisfactory manner, the entity can be identified as "trusted."

The trusted entities need not be limited to businesses that sell goods and/or services, but can also include entities such as schools, other individuals, or in general any one or any entity that is identified as being trusted. For example, in a social networking environment, parents can establish rules that can identify certain chat groups or other users that are trusted. In conjunction with the intelligent module, for example, a child can request a parent to approve a specific entity as trusted, and communications with that entity are restricted until it is approved by that parent.

Trusted status can also be achieved by, for example, the intelligent agent module 580 analyzing an entity's, user's or merchant's feedback. Upon a merchant having reached a threshold level of feedback, the agent can identify the merchant as "trusted" which could then, optionally, forward the "trusted" identification to an additional entity, such as a parent, for final approval.

Figure 4:
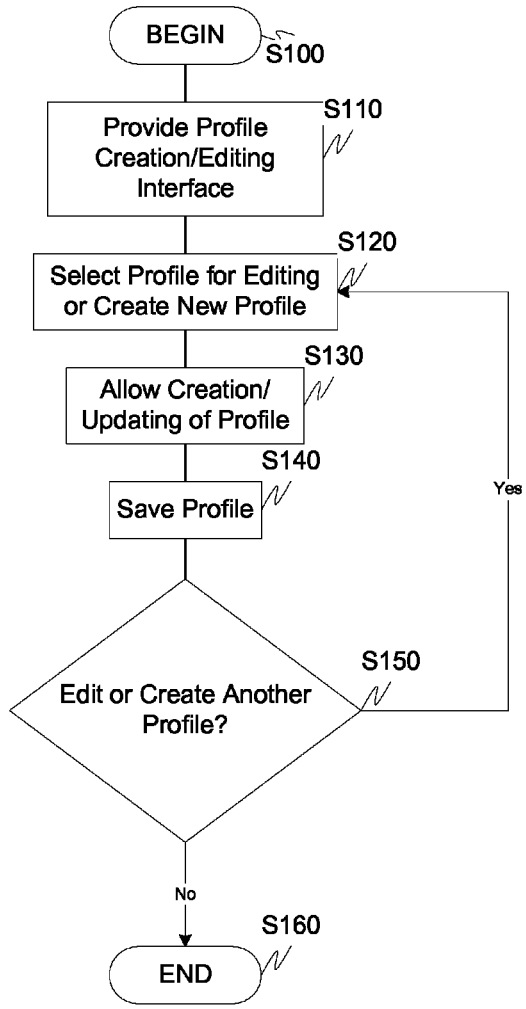
FIG. 4 is a flowchart outlining an exemplary method for creating or editing a profile according to this invention.

FIG. 4 outlines an exemplary method for profile management. In particular, control begins in step S100 and continues to step S110. In step S110, an interface is provided that allows for one or more of creation and editing of a profile. Next, in step S120, an option is provided for editing or creating a new profile. Then, in step S130, and optionally based on password verification, creation, editing or updating of the profile is allowed. Control then continues to step S140.

In step S140, the profile is saved. Next, in step S150, a determination is made whether to edit or create another profile. If editing or creation of another profile is desired, control jumps back to step S120, with control otherwise ending in step S160.

Figure 5:
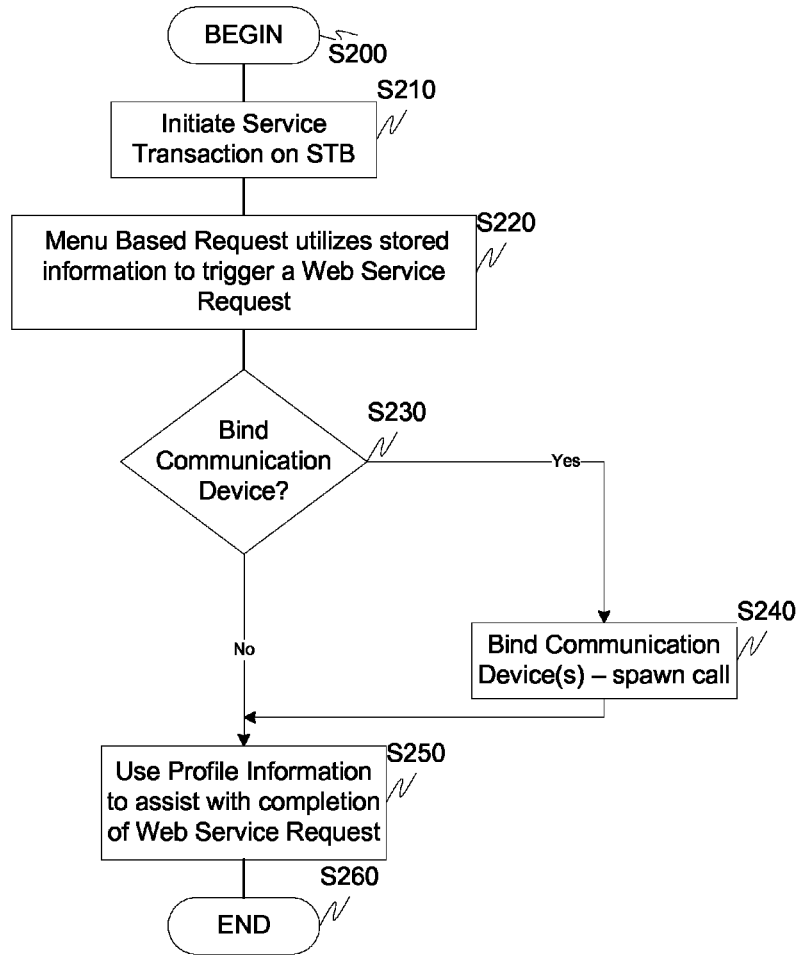
FIG. 5 is a flowchart outlining an exemplary method for performing a service transaction according to this invention.

FIG. 5 outlines an exemplary method for a service transaction. In particular, control begins in step S200 and continues to step S210. In step S210, a service transaction is initiated on or in association with the set-top box. As will be appreciated, the original request for initiation of a service transaction can come from one or more of the attached or associated devices such as a TV, personal computer, or the like. As previously discussed, this service transaction could also be initiated from an associated device, such as a SIP enabled communications device.

In step S220, a web service request is triggered by, for example, a menu based request that has stored information that can be derived from, for example, the stored profile. Next, in step S230, a determination is made whether another device, such as a communication device, should be bound to the service transaction. If another device should be bound to the service transaction, control jumps to step S240 where the communication device is bound, and for example, a call is spawned from that device.

Otherwise, control continues to step S250, where profile information is used to assist with completion of the web service request. Control then continues to step S260 where the control sequence ends.

Figure 6:
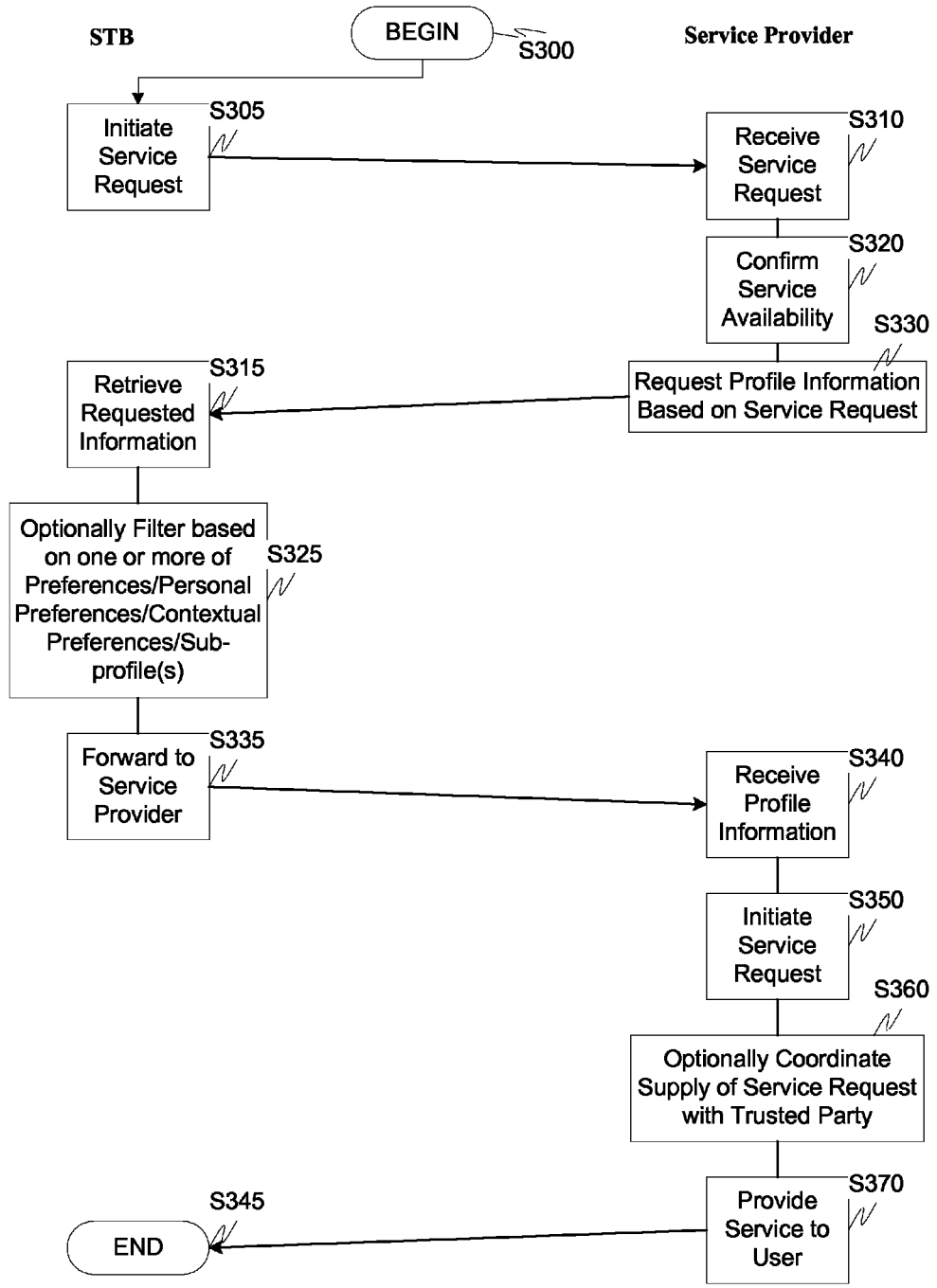
FIG. 6 is a flowchart illustrating the exemplary interaction between a set-top box and a service provider according to this invention.

FIG. 6 outlines an exemplary exchange between the set-top box and a service provider. This exemplary exchange could be utilized upon the initiation of a service request from a user associated with a set-top box to a goods and/or services provider. In particular, control begins in step S300 and continues to step S305. In step S305, a service request is initiated. As will be appreciated, this could also be a request for goods or in general a request for anything. Next, in step S310, the service request is received. Then, in step S320, a check is made to determine that the service availability is present. Control then continues to step S330, where the profile information stored on the set-top box is requested based on, for example, information in the service request. Next, in step S315, the requested information is retrieved. Next, in step S325, the requested information can be filtered based on one or more of preferences, personal preferences, contextual preferences, sub-profiles, analysis by one or more of a security agent or intelligent agent, or in general any filtering criteria. The filtered information is then forwarded to the service provided in step S335. Next, in step S340, the profile information is received. Then, in step S350, the service request is initiated. Control then continues to step S360.

In step S360, the coordination of the supply of goods and/or services can optionally be coordinated with, for example, an outside party, such as a trusted entity. Then, in step S370, the service is provided to the user, with control then continuing to step S345 where the control sequence ends.

Figure 7:
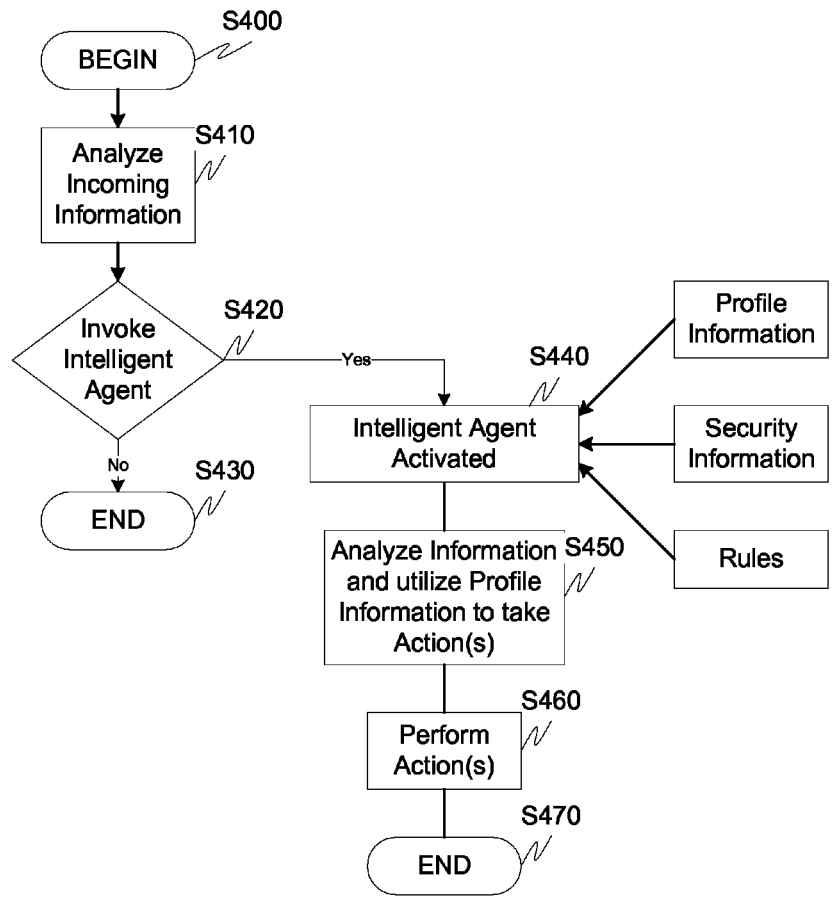
FIG. 7 illustrates an exemplary flowchart for intelligent agent performance according to this invention.

FIG. 7 outlines an exemplary method for analyzing incoming information and the use of an intelligent agent. In particular, control begins in step S400 and continues to step S410. In step S410, one or more types of information, such as information incoming to the set-top box, information from the set-top box, and information received from a user, can be analyzed. Next, in step S420, a determination is made whether to invoke the intelligent agent based on this analysis. This analysis can be based on, for example, logic in the form of one or more of neural networks, expert systems, key word searching, or the like. If the intelligent agent is to be invoked, control jumps to step S440 with control otherwise continuing to step S430 where the control sequence ends.

In step S440, the intelligent agent is activated. Inputs to assist the intelligent agent with determining an appropriate action can include one or more of profile information, security information, and rules, and can also be based on queries that are spawned to, for example, an end user. Control then continues to step S450.

In step S450, the information that triggered the spawning of the intelligent agent is analyzed, and utilization of profile information, security information, rules, query responses and the like is taken into consideration for an appropriate action. Next, in step S460, the action is performed, with control continuing to step S470 where the control sequence ends.

Figure 8:
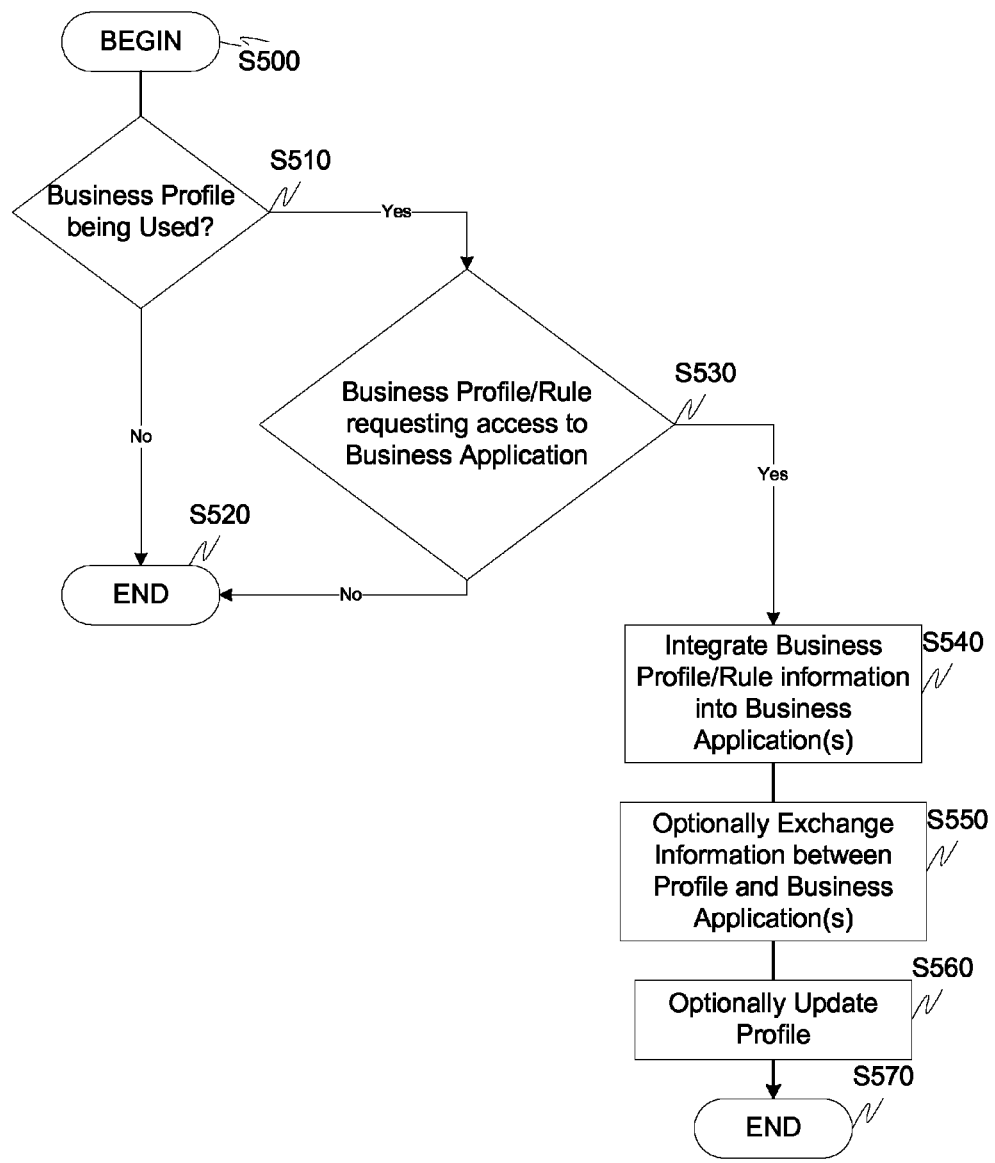
FIG. 8 is a flowchart illustrating an exemplary method for utilization of a business profile according to this invention.

FIG. 8 outlines an exemplary method for business profile interaction according to this invention. In particular, control begins in step S500 and continues to step S510. In step S510, a determination is made whether a business profile is being used. If a business profile is being used, control jumps to step S530, with control otherwise continuing to step S520 where the control sequence ends.

In step S530, a determination is made whether one or more of a business profile and rule is requesting access to a business application. If the determination result is yes, control jumps to step S540, with control otherwise continuing back to step S520 where the control sequence ends.

In step S540, the business profile and/or rule information is integrated with one or more business applications. Next, in step S550, information can optionally be exchanged between the profile and business applications. Then, in step S560, the profile can optionally be updated with information received from the one or more business applications. In a similar manner, information from the profile can be used to update the one or more business applications with selected information. Control then continues to step S570 where the control sequence ends.

Figure 9:
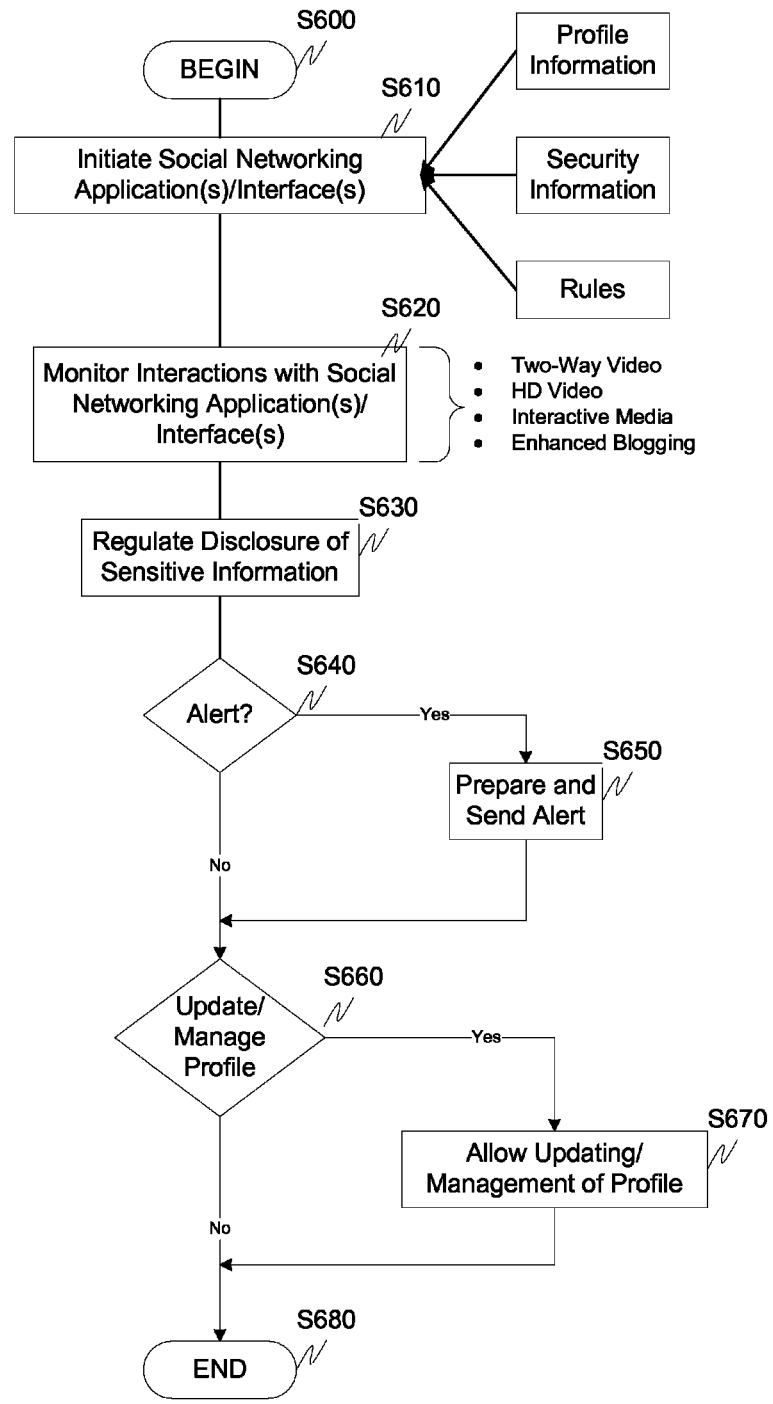
FIG. 9 is a flowchart outlining an exemplary method for social network interaction according to this invention.

FIG. 9 illustrates an exemplary method of social networking utilizing the set-top box and profile(s) associated therewith. In particular, control begins in step S600 and continues to step S610. In step S610, one or more social networking applications are initiated with their corresponding interfaces. Initiation of the various social networking applications can be limited by information in the profile, security information, and/or rules. For example, as discussed above, parental controls may be input into the rule set, thereby restricting the type of social networking application that can be available to certain users. This type of restrictive rule can be placed in the master profile, with a hierarchical rule set that governs all subordinate profiles. Next, in step S620, interactions with one or more social networking applications can be monitored for compliance with security information, the rules, and, for example, information in the profile. The various types of interactions include two-way video, high definition video, interactive media, enhanced blogging, text messaging, chat, or in general, any communication modality. Control then continues to step S630.

In step S630, the disclosure of sensitive information is regulated by the intelligent agent with reliance on the rules, security information, and type of profile. For example, as previously discussed, if this is a child's profile, a parent can apply various rules and security information that regulates the disclosure of sensitive information, with, in step S640, a determination being made, upon violation of one or more of the security information and rules, of whether an alert should be sent. If an alert should be sent, control continues to step S650 where an alert is prepared and sent. Otherwise, control jumps to step S660.

In step S660, an option is provided to manage or update the profile. If managing or updating is required, control continues to step S670, with control otherwise jumping to step S680 where the control sequence ends.

In step S670, updating and/or management of the profile is allowed. This updating or management can be user-centric, for example, if a user wants to add another social networking application to a trusted category, update personal information, update payment information, or in general update any information associated with the profile. In addition, the profile can also be managed by a superior profile holder, such as a parent, as appropriate.

Figure 10:
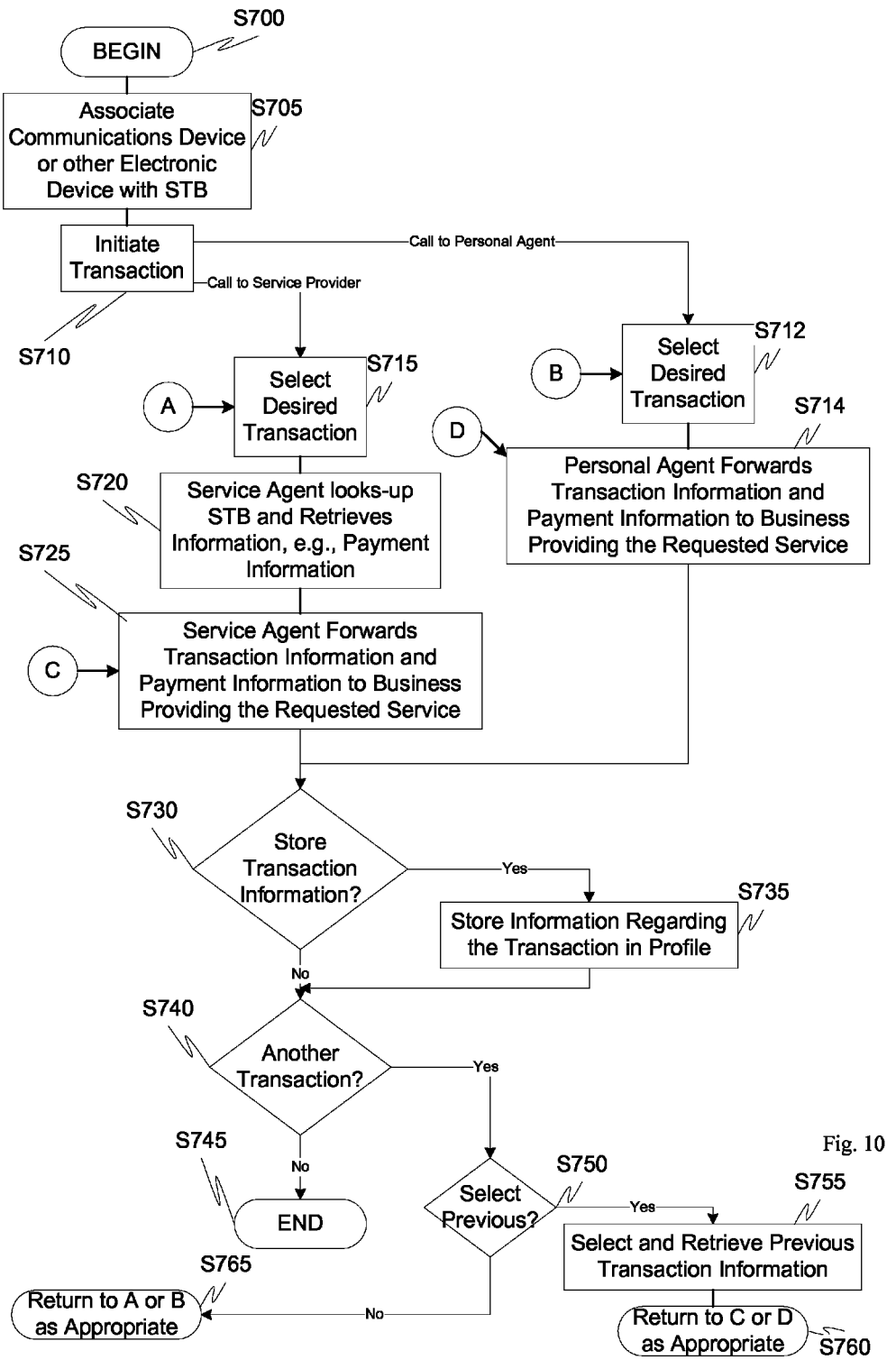
FIG. 10 is a flowchart outlining an exemplary method for initiating a transaction in greater detail according to this invention.

FIG. 10 illustrates an exemplary method for initiating a transaction in greater detail. In particular, control begins in step S700 and continues to step S705. In step S705, one or more communications devices or other electronic devices are associated with the STB. For example, a phone number or other identifier can be stored in the profile with an indication that the device associated with that identifier or phone number is associated with the STB. This activity could be user centric, in association with the service provider, or in general, through any process. Next, in step S710, a transaction is initiated. Depending on whether a personal agent or a service provider agent is being used for the particular instance of the invention, control continues to either step S712 or step S715, respectively.

In step S715, a desired transaction is selected. This desired transaction can be selected from a list of available transactions, or, for example, a user can navigate via a web-based service to find merchants, service providers, or the like, with which they would like to initiate a transaction. Next, in step S720, the service agent looks up the STB and retrieves information, such as payment information, from the profile. Then, in step S725, the service agent forwards the transaction information and payment information to the business providing the requested service. Control then continues to step S730.

In a similar manner, in step S712, a desired transaction is selected in cooperation with a personal agent. As with the transaction request to a service provider, the selection of the desired transaction can be either from one or more of canned transactions, or navigated to, based on, for example, web navigation. Next, in step S714, the personal agent forwards the transaction information and payment information to the business providing the requested service. The transaction information can include such information as the name of the person placing the order, address, phone number, order options, and in general any information associated with an order. Control then continues to step S730.

In step S730, a determination is made whether the transaction information is to be stored. If the transaction information is to be stored, control continues to step S735 with control returning to step S740.

In step S740, a determination is made whether another transaction is desired. If another transaction is desired, control jumps to step S750, with control otherwise ending at step S745.

In step S750, a determination is made whether a previous transaction should be reused. If it is to be reused, control continues to step S755 with the selection and retrieval of the previous transaction, with control continuing in step S760 to either step S725 or step S714 as appropriate.

If a previous transaction is not to be reused, control continues to step S765 where control returns to either step S715 of step S712, as appropriate.

Figure 11:
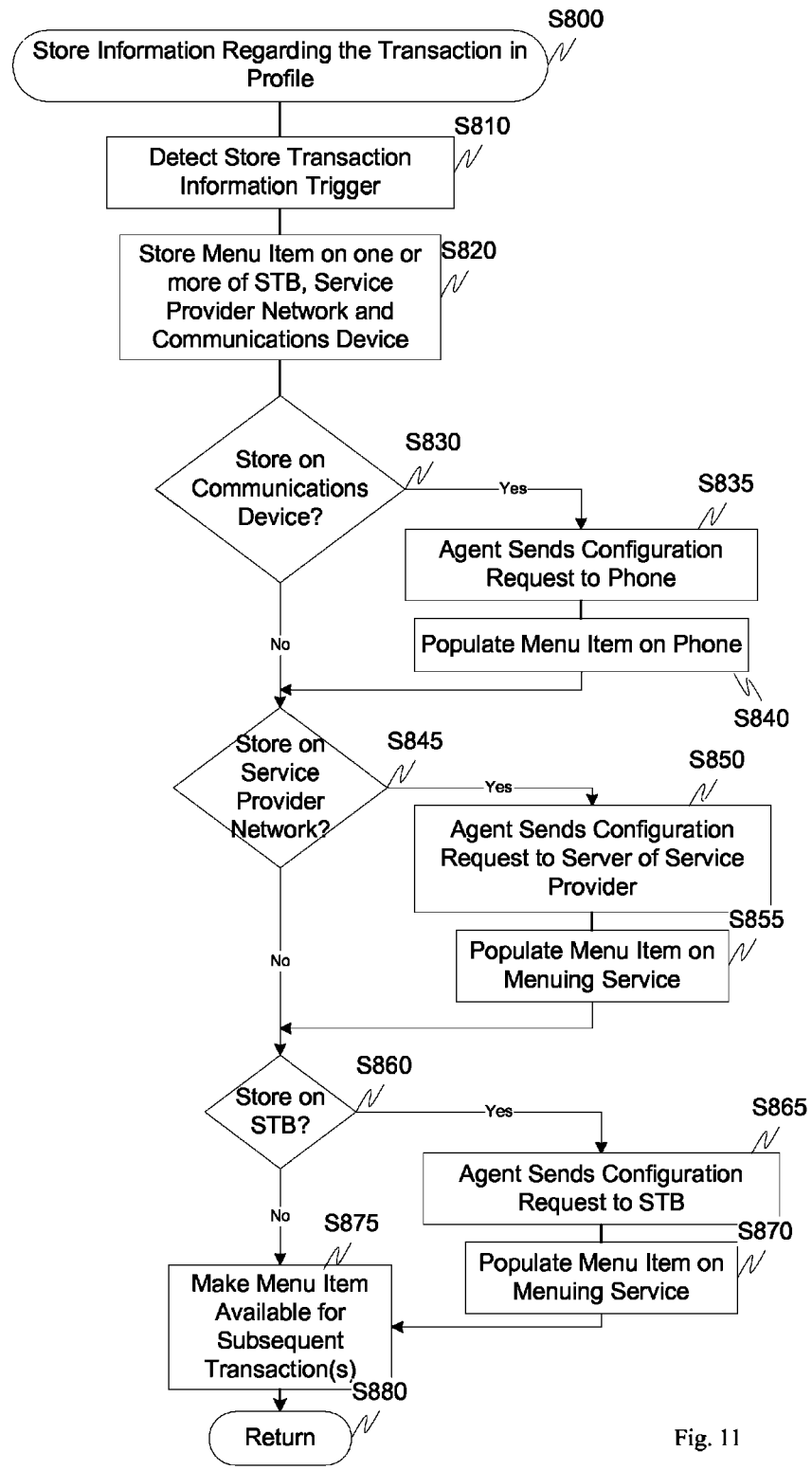
FIG. 11 is a flowchart outlining an exemplary method for storing transaction information in greater detail according to this invention.

FIG. 11 illustrates in greater detail storing information regarding the transaction of step S735. In particular, control begins in step S800 and continues to step S810. In step S810, the stored transaction information trigger is detected. For example, upon completion of a transaction, the user can be queried as to whether they would like to store the transaction. Next, in step S820, information regarding the transaction can be stored in one or more of the STB, service provider network, and communications device, depending on, for example, whether a personal agent or service agent is being used and whether the device from which the transaction request was sent is able to store the transaction information. Then, in step S830, a determination is made whether the information should be stored on the communications device. If the information is to be stored on the communications device, control continues to step S835. Otherwise, control jumps to step S845.

In step S835, an agent sends a configuration request to the phone. Next, in step S840, the menu item is populated on the phone with control continuing to step S845.

In step S845, a determination is made whether the transaction information should be stored on the service provider network. If the transaction information is to be stored on the service provider network, control continues to step S850, with control otherwise continuing to step S860.

In step S860, a determination is made whether to store the transaction information on the set-top box, e.g., in a profile. If the transaction information is to be stored on the set-top box, control continues to step S865. Otherwise, control jumps to step S875.

In step S865, an agent sends a configuration request to the set top box. Next, in step S870, the menu item is populated on the menuing service, with control continuing to step S875.

In step S875, the menu item is made available for subsequent transactions. Control then continues to step S880 where the control sequence ends.

Figure 12:
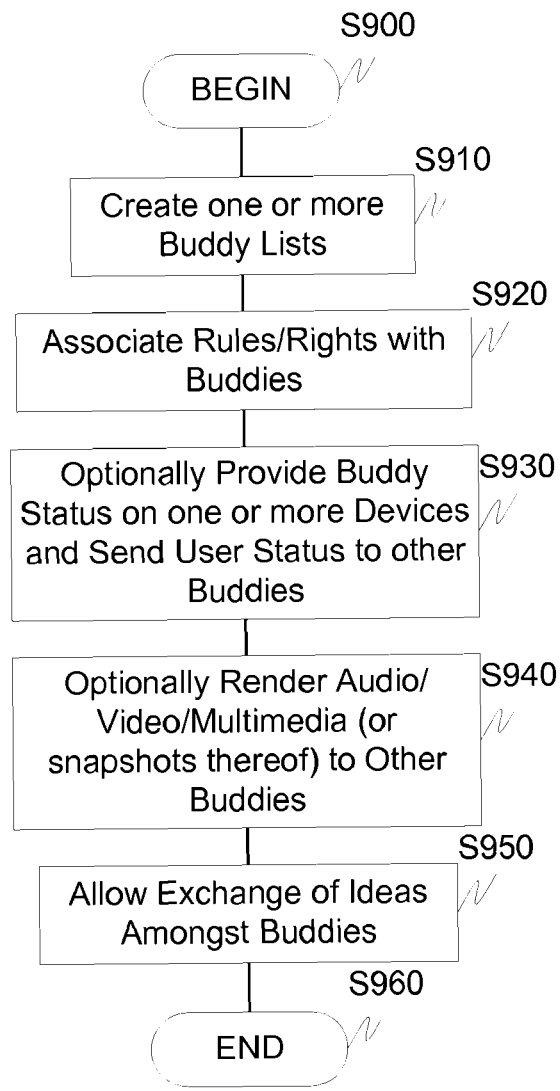
FIG. 12 is a flowchart outlining an exemplary method for social network interaction in greater detail according to this invention.

FIG. 12 illustrates in greater detail a social networking application associated with an exemplary embodiment of the present invention. In particular, control begins in step S900 and continues to step S910. In step S910, one or more buddy lists of one or more buddies are created. Next, in step S920, one or more of rules, rights, and preferences are associated with the one or more buddies. Then, in step S930, the status of one or more buddies can optionally be populated on the user's device. In a similar manner, the status of the user can be pushed to other users' devices and their status provided thereon. Control then continues to step S940.

In step S940, one or more of audio, video and multi-media content can optionally be rendered on other buddies' devices. Snapshots or screen captures or audio sub-clips can also be provided to the other buddies. Next, in step S950, information can be exchanged among the buddies via one or more of text messaging, chat, or any other known methods of exchanging information between devices. Control then continues to step S960 where the control sequence ends.

Below are examples of transactions, the setup of these transaction and options for performing the transaction according to exemplary embodiments of this invention.

In accordance with a first exemplary scenario, a user is assumed to either have a cell phone provided by a service provider or to have a cell phone number that is associated with the phone specially stored as a contact in their profile. In the latter case, an agent in the STB shares the cell phone data with a server in the service provider so that calls from that cell phone can be associated with that user and their specific STB. A user inputs their personal data and financial preferences (including credit card information and preferences, and bank account information and preferences) into their secure profile stored on the STB. At some later time when they make a transaction (like ordering a pizza from a local pizza delivery shop), the personal agent on the STB prompts the user to indicate if they would like this transaction to be stored as a preference for future use. If the user indicates that they would like to store the transaction, then at a still later time, when the user is returning home (where the STB is) and desires to make the same transaction (ordering a pizza), the user can use their cell phone and call the personal agent phone number associated with the STB. The call to the personal agent results in a voice menu being presented to the user from which the user can select the desired transaction orally, for example with the assistance of an agent or an IVR-type system. This request is then sent from the STB with secure payment information to the business providing the requested service for the transaction.

In another exemplary scenario, a user is assumed either to have a cell phone provided by the service provider or to have the cell phone number that is associated with the phone specially stored as a contact in their profile. In the latter case, an agent in the STB shares the cell phone data with a server in the SP so that calls from that cell phone can be associated with that user and their specific STB. The user inputs their personal data and financial preferences (including credit card information and preferences, and bank account information and preferences) into their secure profile stored on the STB. At some later time, when they make a transaction (like ordering a pizza from a local pizza delivery shop), the personal agent on the STB prompts the user to indicate if they would like this transaction to be stored as a preference for future use. If the user indicates that they would like to store the transaction, then at a still later time, when the user is returning home (where the STB is) and desires to make the same transaction (ordering a pizza), the user uses their cell phone and calls a service provider agent service phone number that is associated with a set of servers in the service provider network. The call to the service agent results in the user being presented with a voice menu from which the user can select the desired transaction either orally or based on keyed-in responses. The service agent then uses the association of the cell phone with the user to determine the STB for the user, and then uses this information to launch a secure fetch of the payment information and to send the transaction request to the business providing the requested service for the transaction.

In yet another scenario, a user is assumed either to have a cell phone or some other type of communication device provided by the service provider or to have the cell phone number of the device specially stored as a contact in their profile. In the later case, an agent in the STB shares the cell phone data with a server in the service provider system so that calls from that cell phone can be associated with that user and their specific STB. The user inputs their personal data and financial preferences (including credit card information and preferences, and bank account information and preferences) into their secure profile stored on the STB. At some later time, when the user makes a transaction (like ordering a pizza from a local pizza delivery shop), the personal agent on the STB prompts the user to indicate if they would like this transaction to be stored as a preference to be used in the future. If the user indicates that they would like to store this transaction, the agent sends a configuration request to the user's cell phone so that a menu item associated with the preference is created on the cell phone and made easily accessible in the future. At a still later time, when the user is returning home (where the STB is) and desires to make the same transaction (ordering a pizza), the user uses their cell phone menu button to indicate the request to a set of servers in the service provider network. The request launches a secure fetch of the payment information and sends the transaction request to the business providing the requested service for the transaction.

For another exemplary scenario, a user is assumed either to have a cell phone provided by the service provider or to have the cell phone number of the cell phone specially stored as a contact in their profile. In the latter case, an agent in the STB shares the cell phone data with a server in the service provider network so that calls from that cell phone can be associated with that user and their specific STB. The user inputs their personal data and financial preferences (including credit card information and preferences, and bank account information and preferences) into their secure profile stored on the STB. At a later time, when the user makes a transaction (like ordering a pizza from a local pizza delivery shop), the personal agent on the STB prompts the user to indicate if they would like this transaction to be stored as a preference for future use. If the user indicates that they would like to store the transaction, the agent sends a configuration request to a server in the SP network that provides service menuing to the cell phone. At a still later time when the user is returning home (where the STB is) and desires to make the same transaction (ordering a pizza), the user uses their cell phone to access their menuing preferences stored in the SP network. They select the menu button for the desired transaction, which indicates the request to a set of servers in the SP network. The request launches a secure fetch of the payment information and sends the transaction request to the business providing the requested service for the transaction.

Below are examples of social networking applications based on exemplary embodiments described herein.

In a first exemplary scenario, a user is assumed either to have a cell phone provided by the service provider or to have the cell phone number of the cell phone specially stored as a contact in their profile. In the latter case, an agent in the STB shares the cell phone data with a server in the SP so that calls from that cell phone can be associated with that user and their specific STB. The user inputs their personal data and financial preferences (including credit card information and preferences, and bank account information and preferences) into their secure profile stored on the STB. At a later time, the user indicates, either in their preferences, via a web transaction, or via a cell phone menu, that a group of other SP users are "buddies" of the user. Any user can have a number of buddy groups, and other users can be members of multiple buddy groups for the same user or for different users. A specific buddy group makes up an instance of a social network for the user.

Using methods well known in the art, the presence of each user in the buddy group can be exposed in real-time to the whole group. (Watching a television program, or currently mobile, busy, or off-line, are examples of buddy states). The STB social network agent provides an interface to indicate the buddy state to a network server and to provide the ability to render the state of the user's buddies over the top of a program that the user is viewing. The agent is capable of rendering video and/or audio of both the viewer and the program being viewed to the network server. The network server can in turn render the video and audio in an appropriate format to the other buddies in the users' currently selected group while respecting any copy restriction flags in the program material sent to it. The social network agent in the STB, and an appropriate client in the cell phone then make it possible for the buddies to share their thoughts, feelings, and reactions to the program being watched. Their interaction can be stored on the network server to be accessible to the other buddy list members. Optionally, the conversation can be tagged and made available for search and access by other members of the social network service being provided by the enterprise. Some service providers may give to active buddy groups privileged access to desired material in order to generate interest in the material by other groups.

A number of variations and modifications of the invention can be used. It would be possible to provide for some features of the invention without providing others.

The exemplary systems and methods of this invention have been described in relation to STB's and profile(s). However, to avoid unnecessarily obscuring the present invention, the description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show various components of the system collocated, certain components of the system can be located remotely, at distant portions of a distributed network 10, such as a LAN, cable network, and/or the Internet, or within a dedicated system. Thus, it should be appreciated, that the components of the system can be combined in to one or more devices, such as a STB, or collocated on a particular node of a distributed network, such as an analog and/or digital communications network, a packet-switch network, a circuit-switched network or a cable network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, a cable provider, in one or more communications devices, at one or more users' premises, or some combination thereof. Similarly, one or more functional portions of the system could be distributed between a communications device(s), such as a STB, and an associated computing device. The one or more functional portions of the system could be also be installed in a TV or TV tuner card, such as those installed in a computer.

Furthermore, it should be appreciated that the various links, such as link 5, connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

In yet another embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A set-top box with an operating system layer operable to support cable network interconnectability and to provide an application platform comprising:
   one or more profiles, each profile including personal information and personal preferences, one or more of the personal information and personal preferences used in association with a service application or communications application for operation of the service application or the communications application;
   a profile interface operable to allow management of the one or more profiles, the management including one or more of creation and editing of the one or more profiles; and
   an intelligent agent operable to use information in the one or more profiles to perform automatic or semi-automatic tasks on behalf of a user in association with one or more of the service application or communications application, wherein the intelligent agent utilizes one or more rules for dynamic application behavior and the intelligent agent is operable to perform:
      monitoring a transaction between the user on the set-top box and another entity;
      receiving an indication from the user to store the transaction between the user and the other entity as a preference for future use;
      receiving a telephone number associated with the user to store in the one or more profiles;
      receiving a telephone call from the user;
      presenting a voice menu to the user to select the stored transaction;
      receiving a selection of the stored transaction;
      in response to receiving the selection of the stored transaction, initiating the stored transaction;
      determining a set-top box for the user based on the telephone number associated with the user;
      in response to determining the set-top box for the user based on the telephone number associated with the user, launching a secure fetch of payment information; and
      sending payment information as part of the initiated stored transaction.

2. The set-top box of claim 1, wherein the one or more profiles comprise one or more of personal information, communications preferences, personal preferences, payment information, vendor information, priority information, contextual preferences, one or more sub-profiles, alternate contact modalities and one or more trusted contacts.

3. The set-top box of claim 1, adapted to receive one or more of television programming, data, voice information, internet communications, VOIP communications, ecommerce communications, communication from attached electronic devices and content.

4. The set-top box of claim 1, wherein the intelligent agent also utilizes one or more of security information and the rules to perform the automatic or the semi-automatic tasks.

5. The set-top box of claim 1, wherein the service application includes an intelligent agent operable to initiate a service transaction request that includes information from the one or more profiles, the initiate service transaction request utilizing internet-based protocols to communicate with one or more of a trusted entity, a content/service provider and the other entity.

6. The set-top box of claim 1, further comprising rules operable to both trigger the tasks and manage the operation of the tasks.

7. The set-top box of claim 1, further comprising a security module operable to one or more of filter, analyze, restrict access to, restrict dissemination of and control information in the one or more profiles.

8. The set-top box of claim 1, further comprising one or more sub-profiles, the behavior of which is governed by the one or more profiles.

9. A method of operating a set-top box with an operating system layer operable to support cable network interconnectability and to provide an application platform comprising:
   establishing one or more profiles, each profile including personal information and personal preferences, one or more of the personal information and personal preferences used in association with a service application or communications application for operation of the service application or the communications application;
   managing of the one or more profiles, the management including one or more of creation and editing of the one or more profiles; and
   invoking an intelligent agent and a processor to use information in the one or more profiles to perform an automatic or semi-automatic task on behalf of a user in association with one or more of the service application or communications application, wherein the intelligent agent utilizes one or more rules for dynamic application behavior and the intelligent agent is operable to perform:

monitoring a transaction between the user on the set-top box and another entity;

receiving an indication from the user to store the transaction between the user and the other entity as a preference for future use;

receiving a telephone number associated with the user to store in the one or more profiles;

receiving a telephone call from the user;

presenting a voice menu to the user to select the stored transaction;

receiving a selection of the stored transaction;

in response to receiving the selection of the stored transaction, initiating the stored transaction:

determining a set-top box for the user based on the telephone number associated with the user;

in response to determining the set-top box for the user based on the telephone number associated with the user, launching a secure fetch of payment information; and sending payment information as part of the initiated stored transaction.

10. The method of claim 9, wherein the one or more profiles comprise one or more of personal information, communications preferences, personal preferences, payment information, vendor information, priority information, contextual preferences, one or more sub-profiles, alternate contact modalities and one or more trusted contacts.

11. The method of claim 9, further comprising receiving one or more of television programming, data, voice information, internet communications, VOIP communications, ecommerce communications, communication from attached electronic devices and content.

12. The method of claim 9, wherein the intelligent agent also utilizes one or more of security information and the rules to perform the automatic or the semi-automatic task.

13. The method of claim 9, wherein the service application includes an intelligent agent operable to initiate a service transaction request that includes information from the one or more profiles, the initiate service transaction request utilizing internet-based protocols to communicate with one or more of a trusted entity, a content/service provider and the other entity.

14. The method of claim 9, further comprising using rules to both trigger the tasks and manage the operation of the tasks.

15. The method of claim 9, wherein the intelligent agent is a software agent that assists users, and will act on their behalf, in performing non-repetitive computer-related tasks.

16. The method of claim 9, one or more of filtering, analyzing, restricting access to, restricting dissemination of and controlling information in the one or more profiles.

17. A system for operating a set-top box with an operating system layer operable to support cable network interconnectability and to provide an application platform comprising:

means for establishing one or more profiles, each profile including personal information and personal preferences, one or more of the personal information and personal preferences used in association with a service application or communications application for operation of the service application or the communications application;

means for managing of the one or more profiles, the management including one or more of creation and editing of the one or more profiles; and means for invoking an intelligent agent to use information in the one or more profiles to perform an automatic or semi-automatic task on behalf of a user in association with one or more of the service application or communications application, wherein the intelligent agent utilizes one or more rules for dynamic application behavior and the intelligent agent is operable to perform:

means for monitoring a transaction between the user on the set-top box and another entity;

means for receiving an indication from the user to store the transaction between the user and the other entity as a preference for future use;

means for receiving a telephone number associated with the user to store in the one or more profiles;

means for receiving a telephone call from the user;

means for presenting a voice menu to the user to select the stored transaction;

means for receiving a selection of the stored transaction;

in response to receiving the selection of the stored transaction, means for initiating the stored transaction;

means for determining a set-top box for the user based on the telephone number associated with the user;

in response to determining the set-top box for the user based on the telephone number associated with the user, means for launching a secure fetch of payment information; and means for sending payment information as part of the initiated stored transaction.

\* \* \* \* \*